US009231672B2

United States Patent
Campos et al.

(10) Patent No.: US 9,231,672 B2
(45) Date of Patent: *Jan. 5, 2016

(54) MULTIPLE-INPUT MULTIPLE-OUTPUT (MIMO) COMMUNICATION SYSTEM

(71) Applicant: Cable Television Laboratories, Inc., Louisville, CO (US)

(72) Inventors: Luis Alberto Campos, Superior, CO (US); Jennifer Andreoli-Fang, Boulder, CO (US); Ian MacMillan, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/181,645

(22) Filed: Feb. 15, 2014

(65) Prior Publication Data

US 2014/0233666 A1    Aug. 21, 2014

Related U.S. Application Data

(63) Continuation-in-part of application No. 13/769,288, filed on Feb. 16, 2013.

(60) Provisional application No. 61/845,340, filed on Jul. 11, 2013.

(51) Int. Cl.
*H04B 7/04* (2006.01)
*H04B 7/02* (2006.01)
*H04B 7/06* (2006.01)
*H04B 7/10* (2006.01)

(52) U.S. Cl.
CPC ............. *H04B 7/0413* (2013.01); *H04B 7/022* (2013.01); *H04B 7/0691* (2013.01); *H04B 7/10* (2013.01)

(58) Field of Classification Search
CPC ..... H04W 88/06; H04W 64/00; H04W 84/06; H04W 52/0216; H04W 52/0219; H04W 72/02; H04W 72/0413; H04W 72/0453; H04W 88/10; H04M 11/04; H04M 2207/20; H04M 2242/04; H04M 2242/30; H04M 3/382; H04B 7/0413; H04B 7/10; H04B 7/0691; H04B 7/022

See application file for complete search history.

(56) References Cited

U.S. PATENT DOCUMENTS

| | | | |
|---|---|---|---|
| 5,185,763 A | 2/1993 | Krishnan | |
| 5,504,783 A | 4/1996 | Tomisato et al. | |
| 5,561,686 A | 10/1996 | Kobayashi et al. | |
| 5,749,857 A | 5/1998 | Cuppy | |
| 5,852,630 A * | 12/1998 | Langberg et al. | 375/219 |
| 6,941,079 B1 | 9/2005 | Barozzi et al. | |
| 6,944,120 B2 | 9/2005 | Wu et al. | |

(Continued)

FOREIGN PATENT DOCUMENTS

| | | |
|---|---|---|
| WO | 2005/062498 | 7/2005 |
| WO | 2011/161637 | 12/2011 |

*Primary Examiner* — Hirdepal Singh

(74) *Attorney, Agent, or Firm* — Great Lakes Intellectual Property, PLLC

(57) ABSTRACT

A multiple-input multiple-output (MIMO) capable system is contemplated. The communication system may include a signal processor configured to separate an input stream into multiple signal paths to facilitate simultaneous transport through a communication medium. The capability to simultaneously transmit multiples signal paths may be beneficial in order to maximize throughput and/or minimize expense.

15 Claims, 12 Drawing Sheets

(56) References Cited

U.S. PATENT DOCUMENTS

| | | |
|---|---|---|
| 7,391,832 B2 | 6/2008 | Catreux-Erces et al. |
| 8,223,872 B1 | 7/2012 | Zhang |
| 8,849,313 B2* | 9/2014 | Feher .................... H04M 11/04 455/422.1 |
| 2002/0105928 A1* | 8/2002 | Kapoor et al. ................. 370/334 |
| 2002/0122398 A1 | 9/2002 | Jou |
| 2002/0126338 A1 | 9/2002 | Volpi et al. |
| 2004/0037565 A1* | 2/2004 | Young et al. .................. 398/115 |
| 2005/0063340 A1 | 3/2005 | Hoffman |
| 2005/0105632 A1* | 5/2005 | Catreux-Erces et al. ..... 375/267 |
| 2005/0174935 A1 | 8/2005 | Segel |
| 2006/0234663 A1 | 10/2006 | Wilhoyte |
| 2007/0032220 A1 | 2/2007 | Feher |
| 2007/0054625 A1 | 3/2007 | Beale |
| 2007/0101242 A1* | 5/2007 | Yancey ............... G06F 13/4256 714/776 |
| 2009/0028192 A1 | 1/2009 | Rieger et al. |
| 2009/0204877 A1 | 8/2009 | Betts et al. |
| 2010/0035600 A1 | 2/2010 | Hou et al. |
| 2011/0019723 A1 | 1/2011 | Lerner |
| 2011/0080979 A1 | 4/2011 | Duggan |
| 2011/0243025 A1 | 10/2011 | Kim |
| 2012/0206285 A1 | 8/2012 | Khlat |
| 2012/0236971 A1* | 9/2012 | Taghavi Nasrabadi et al. ............................ 375/340 |
| 2012/0281621 A1 | 11/2012 | Lotfallah |
| 2012/0314649 A1* | 12/2012 | Forenza et al. ................ 370/328 |
| 2012/0331111 A1 | 12/2012 | Wu et al. |
| 2013/0016966 A1 | 1/2013 | Jansen et al. |
| 2013/0076566 A1* | 3/2013 | Jiang et al. ..................... 342/373 |
| 2013/0201316 A1 | 8/2013 | Binder et al. |
| 2013/0215833 A1 | 8/2013 | Ong et al. |
| 2013/0216228 A1 | 8/2013 | Nazarathy et al. |
| 2013/0308950 A1 | 11/2013 | Blouza et al. |
| 2013/0337847 A1* | 12/2013 | Sridhara et al. ............. 455/456.6 |
| 2014/0066098 A1 | 3/2014 | Stern et al. |
| 2014/0177745 A1* | 6/2014 | Krishnamurthy et al. .... 375/267 |
| 2014/0179302 A1* | 6/2014 | Polehn .................... H04B 1/38 455/422.1 |
| 2014/0206367 A1 | 7/2014 | Agee et al. |
| 2014/0219267 A1* | 8/2014 | Eyuboglu et al. ............. 370/350 |
| 2014/0233678 A1 | 8/2014 | Campos et al. |
| 2014/0241446 A1* | 8/2014 | Zhang et al. ................... 375/260 |
| 2014/0270776 A1 | 9/2014 | Jinno et al. |
| 2014/0294393 A1 | 10/2014 | Lowery et al. |
| 2014/0302802 A1* | 10/2014 | Chang .................... H04B 1/005 455/78 |
| 2014/0321565 A1 | 10/2014 | Campos et al. |
| 2014/0342659 A1* | 11/2014 | Maharajh .......... G06F 17/30035 455/3.01 |

* cited by examiner

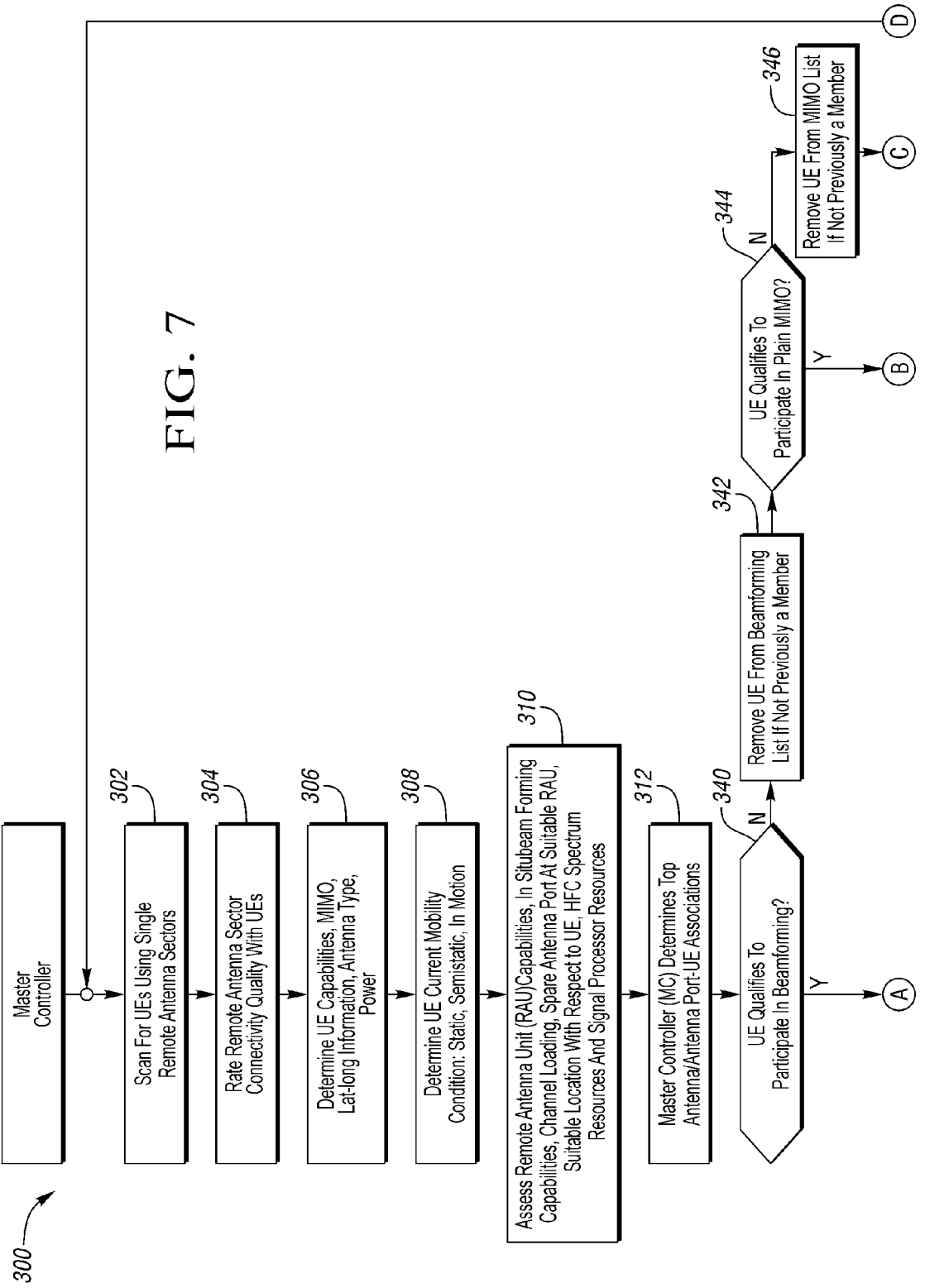

MULTIPLE-INPUT MULTIPLE-OUTPUT (MIMO) COMMUNICATION SYSTEM

CROSS-REFERENCE TO RELATED APPLICATIONS

This application is a continuation-in-part of U.S. application Ser. No. 13/769,288, filed Feb. 16, 2013, and claims the benefit of U.S. provisional application No. 61/845,340 filed Jul. 11, 2013, the disclosures of which are incorporated in their entirety by reference herein.

TECHNICAL FIELD

The present invention relates to communication systems and signal processors, such as but not necessarily limited to those capable of facilitating multiple-input multiple-output (MIMO) or multipath communications.

BACKGROUND

Wireless communications systems may employ multiple-input multiple-output (MIMO) techniques to facilitate multipath communications. The multipath capabilities of MIMO systems allow data to be transmitted simultaneously over multiple paths between a plurality of transmitting devices and a plurality of receiving devices to effectively increase capacity over single path systems.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
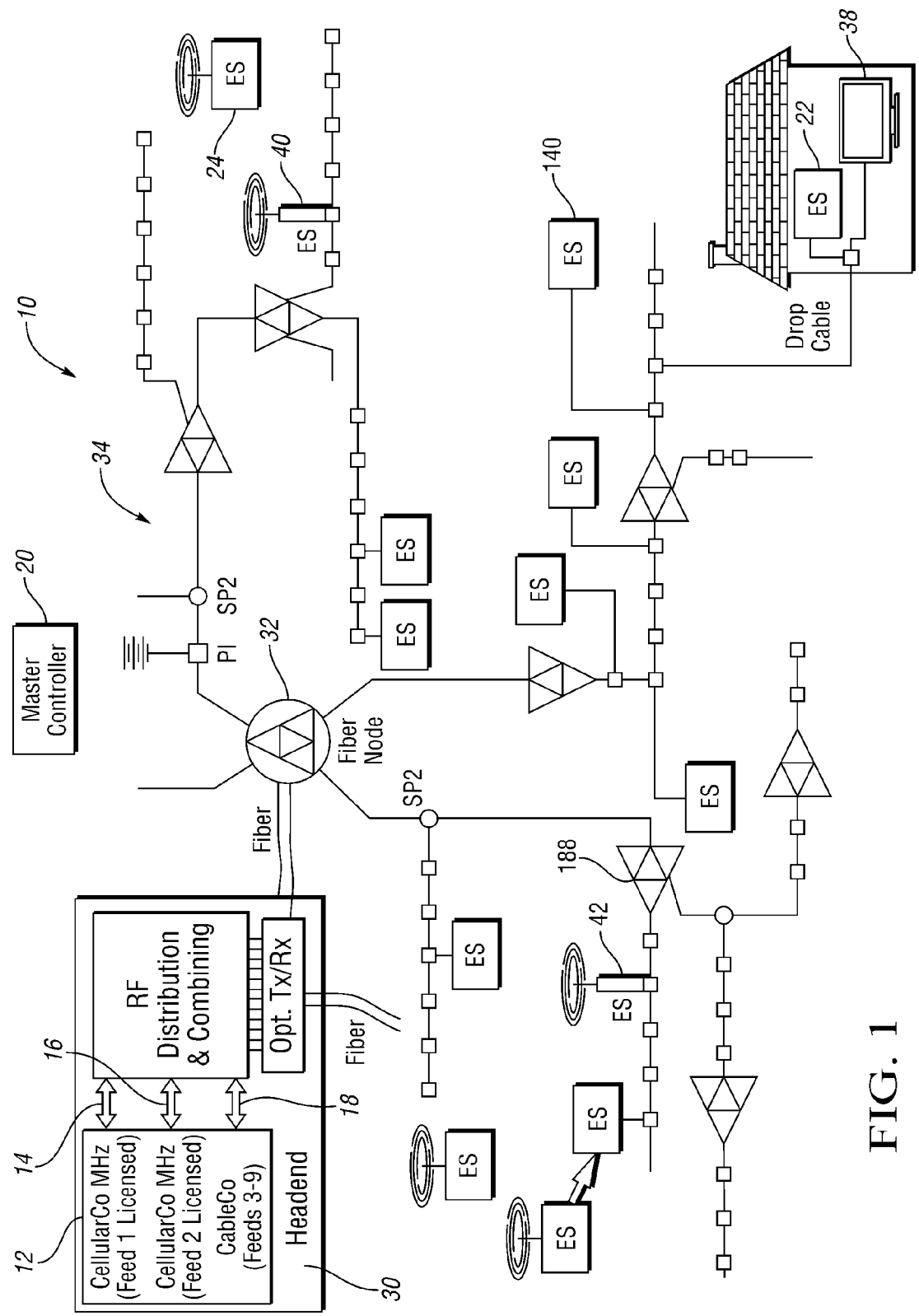
FIG. 1 illustrates a multiple-input multiple-output (MIMO) communication system in accordance with one non-limiting aspect of the present invention.

FIG. 1 illustrates a multiple input multiple output (MIMO) communication system 10 in accordance with one non-limiting aspect of the present invention. The system 10 may be configured to facilitate electronic signaling between a signal processor 12 and one or more end stations (ES), user equipment (UE), access points (APs), terminals or other devices. The signal processor 12 may be configured to facilitate transport of virtually any type of signaling, including signaling associated with a multiple system operator (MSO), such as but not necessarily limited to a cable, satellite, or broadcast television service provider, a cellular service provider, and high-speed data service provider, an Internet service provider (ISP), etc. The communication system 10 is illustrated with respect to the signal processor 12 supporting a first feed 14, a second feed 16, a third feed 18 (representing seven independent feeds), although more or less feeds may be received for transport. Each feed 14, 16, 18 may include data communicated to the signal processor 12 from a local or remote sourcing device/entity as a baseband or other suitable signal. Each feed may be processed for transport with the signal processor 12, optionally with the signal processor 12 comprising separate or independent signal processors for each feed. The first and second feeds 14, 16 may be associated with cellular related signaling (e.g., signaling associated with a cellular phone call) and the third feed 18 may be associated with cable related signaling (e.g., signaling associated with delivery of a television program and/or Internet data download). A master controller 20 may be included as a standalone component and/or integrated into one of the illustrated components in order to facilitate the operations contemplated herein.

The end stations ES correspond with any electronically operable device having capabilities sufficient to facilitate directly or indirectly interfacing a user with signaling transported through the communication system 10. The end stations ES may be a gateway, a router, a computer, a mobile phone, a cellular phone, a media terminal adapter (MTA), a voice over Internet protocol (VoIP) enabled device, a television, a set top box (STB), network address translator (NAT), etc. For exemplary non-limiting purposes, a first end station 22 is shown to be a wireline type of device, such as a home gateway or set-top box configured to output signaling to a television or other device through a wireless and/or wired connection, and a second end station 24 is shown to be a wireless type of device, such as a remote antenna unit, wireless computer, television or cellular phone, optionally having capabilities sufficient to interface signaling using a wireless and/or a wired connection, such as the manner described in U.S. patent application Ser. No. 14/181,641, entitled Multiple-Input-Multiple-Output (MIMO) Communication System, filed Feb. 15, 2014, the disclosure of which is hereby incorporated by reference in its entirety. The use of such first and second end stations 22, 24 may be beneficial in facilitating continued access to a television program while a user travels between locations associated with the first and second ends stations 22, 24. Seamless access to the content may be provided in this manner using different ends stations or capabilities of the end stations, e.g., a wireless capability of the second end station 24 may be used when at one location and a wireline capability of the first end station 22 may be used when at another location.

The present invention contemplates distinguishing between wireless and wireline communications. The wireline communications may correspond with any type of electronic signal exchange where a wire, a coaxial cable, a fiber or other bound medium is used to facilitate or otherwise direct at least a portion of the related signaling, including the signaling exchanged outside of the communicating device/processor. The wireline communications include but are not necessarily limited to those carried at least partially over a fiber/cable backbone associated with a cable television distribution system or an Internet or non-Internet based data communication system. The wireless communications may correspond with any type of electronic signal exchange where an antenna, antenna port or other transmitting type of device is used to communicate at least a portion of the signaling as radio frequency (RF) signals, such as over a wireless link or through an unbound or air medium, optionally in the manner described in U.S. patent application serial number. The wireless communications include but are not necessary limited to satellite communications, cellular communications and Wi-Fi communications. The use of wireline and wireless communications and the corresponding mediums are not intended to limit the present invention to any particular type of medium, protocol, or standard and is instead noted to differentiate between two types of communications, e.g., bound and unbound.

The signaling desired for transports through the communication system 10 may be received at a headend unit 30 associated with the signal processor 12 and thereafter carried by one or more fibers to a fiber node 32, such as the manner described in U.S. patent application Ser. No. 14/181,640, entitled Multiple-Input-Multiple-Output (MIMO) Communication System, filed Feb. 15, 2014, the disclosure of which is hereby incorporated by reference in its entirety. The fiber node 32 may be part of a cable television distribution system 34 from which a plurality of coaxial cables may facilitate further delivery to different geographical areas, optionally with use of splitters and/or amplifiers. The coaxial cables are shown to include a plurality of taps (shown as rectangles) through which various end stations ES may be connected to receive the wireline signaling and/or other signaling associated with the headend, e.g., signaling associated with other types of content and/or data transmissions. The first end station 22 is shown to be connected to one of the taps to facilitate interfacing transported signals to a locally connected, first user equipment (UE) 38. Using LTE over HFC, communications between end station 22 and UE 38 can take place through the signal processor 12 but not directly. Communications between end station 22 and UE 38 can take place directly if other means of communications are used such as WiFi or MoCA or Ethernet. Communications between end station 22 and UE 38 can also take place using LTE over HFC but over a separate system where end station 22 also has signal processor functionality and the UE 38 functions as an end station of this local "home LTE over HFC network". The first end station 22 may be configured to facilitate processing of frequency diverse signals for wireline and/or wireless communication to the UE 38, which is shown to be a television but could be any other type of device, such as a mobile phone, tablet, etc. having capabilities sufficient to access television or data signaling using one or both of a wired and wireless connection. The first end station 22 may be configured to facilitate interfacing transported signals with the first UE 38 by converting frequency diverse signaling to an output signaling stream usable by the UE 38.

A third end station 40 is shown to be configured to facilitate wirelessly signaling with the second end station 24. The third end station 40 may be configured to convert the frequency diverse signals carried over the wireline distribution system 34 to spatially diverse signals or other suitable types of RF signals. The third end station 40 may be included as part of a Wi-Fi access point, a router, a cellular tower, a base station, etc. The ability of the third end station 40 to output wireless signaling may be beneficial if licensing or other restrictions limit how the wireless signals can be transmitted from the third end station 40, e.g., frequency usage restrictions may prevent output of the frequency diverse signals carried over the distribution system 34 to the second end station 24 without being pre-processed by the third end station 40. The third end station 40 may be configured to pre-process the frequency diverse signals carried over the distribution system 34 to suitable wireless signals having other frequency characteristics licensed for use with the second end station 24.

The third end station 40 may be configured to convert received wireline signaling to wireless signaling suitable to any restrictions associated with the second end station 24. The third end station 40 may be useful in allowing a user to access content through different types of devices and/or to facilitate use of other wireless transmission frequencies and communication mediums. The third end station 40 may be configured to facilitate output of spatially diverse signals according to frequency ranges allocated to an originator of the corresponding signaling stream. The second end station 24 may be a handset, mobile phone or other device having capabilities sufficient to process spatially diverse signaling, such as to facilitate interfacing a cellular phone call with the user (additional processing may be done at the second end station 24 to facilitate the phone call or other operation desired for the signaling stream). A fourth end station 42 may be configured to facilitate wirelessly interfacing transported signaling with the second end station 24, such as to enhance spatial diversity of the interfaced wireless signal in the manner described below in more detail.

Figure 2A:
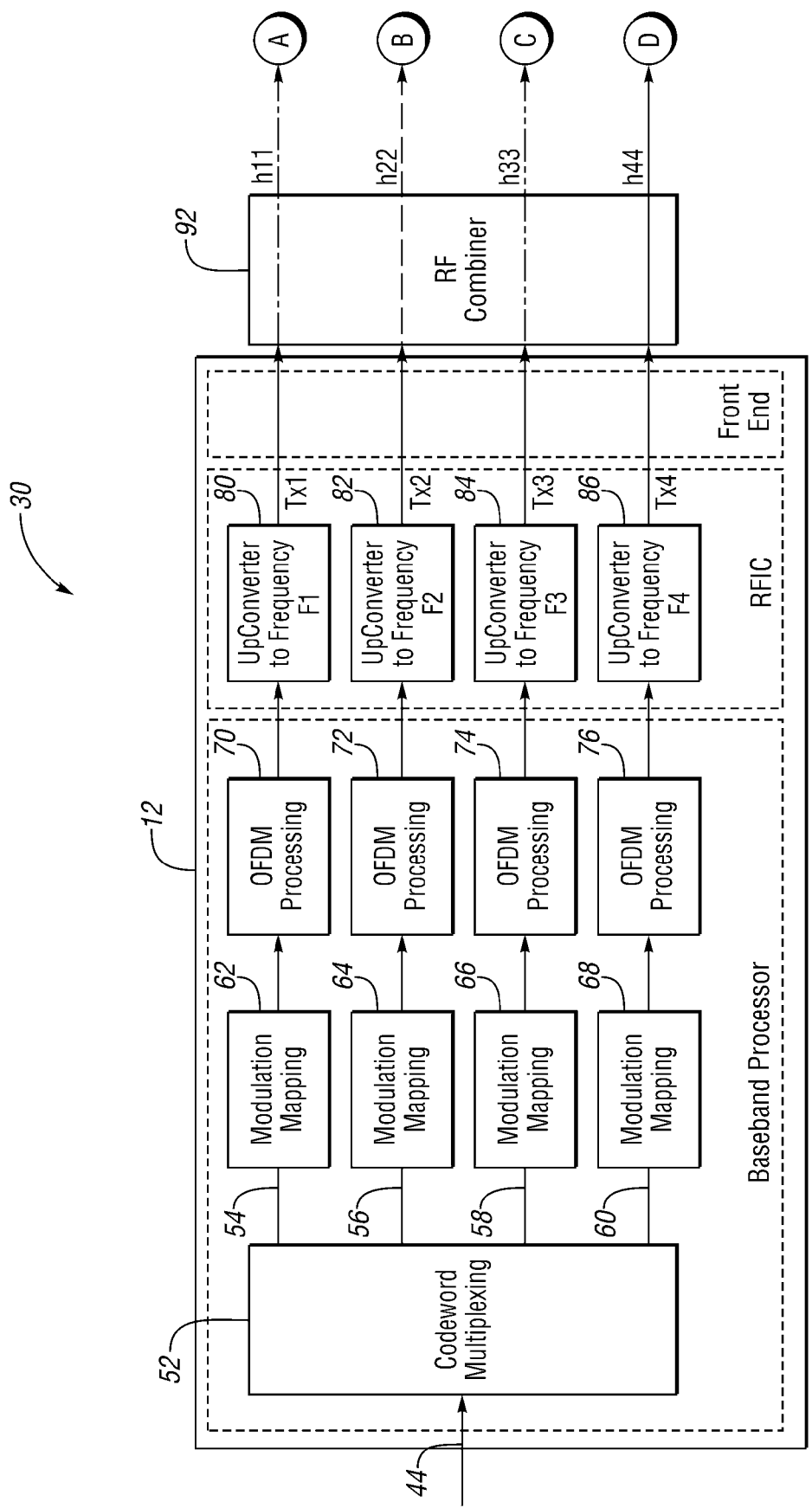
FIGS. 2a-2b schematically illustrate operation of the communication system when facilitating a wireline signaling mode in accordance with one non-limiting aspect of the present invention.
Figure 2B:
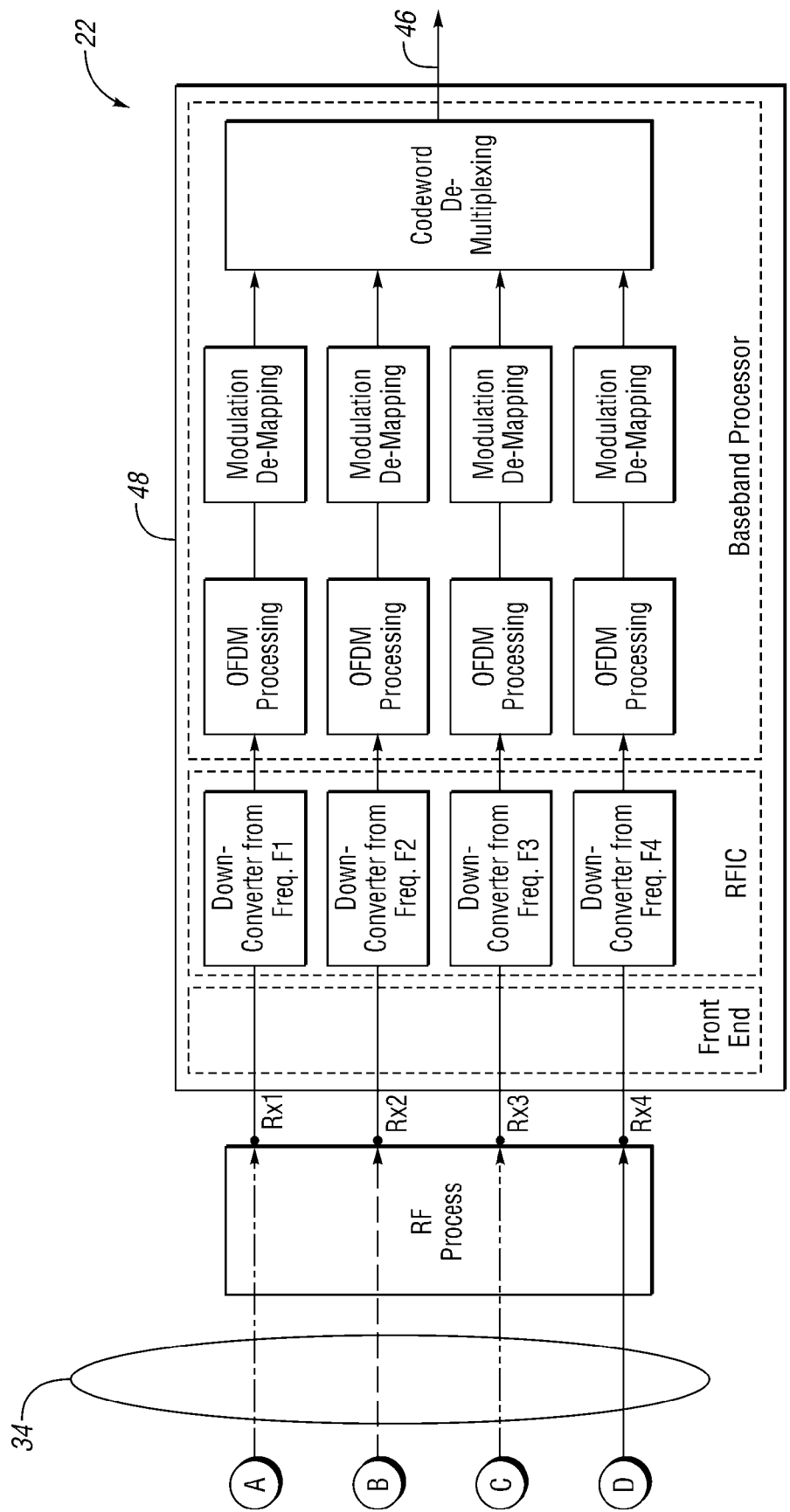

FIGS. 2a-2b schematically illustrate operation of the communication system 10 when facilitating a wireline signaling mode in accordance with one non-limiting aspect of the present invention. The wireline signaling mode corresponds with the signal processor 12 receiving an input signal 44, processing the input signal for transmission over at least a portion of the wireline communication medium 34, and the first end station 22 processing the transmitted signaling into an output signal 46. The output signal 46 may be subsequently transmitted to the first UE 38 or other device for final use. The signal processor 12 may be configured to receive the input signal from a base station, eNodeB, signal processor or other processing element desiring to transport signaling over the communication system (e.g., one of the feeds 14, 16, 18). The base station may be associated with an Internet service provider, a cable television sourcing entity, cellular phone provider or other source capable of providing data to the signal processor 12 for transport. The input signal 44 may be in the form of a baseband signal, a non-continuous wave (CW) type of signal and/or some other signaling/streaming sufficient to represent data, e.g. data represented using binary data bits/bytes and varying voltages or optical intensities. Optionally, the input signal 44 may be a non-diverse signal at least in that the data is carried within a single stream/signal as opposed to being divided for transmission using frequency diverse signaling and/or spatially diverse signaling.

The communication system 10 may be configured to facilitate transport of the input signal 44 (input data, message, video, audio, etc.) from an originating address associated with the sourcing entity to a destination address associated with the first UE 38 (or other end station). The present invention contemplates the signal processor 12 being configured to convert the input signal 44 to an intermediary signal prior to providing long-haul transport of the intermediary signal over one or more of the contemplated communication mediums so that the intermediary signal can be re-processed with another signal processor, such as with a signal processor 48 of the first end station 22 that converts the intermediary signal to the output signal 46, e.g., in the manner described in U.S. patent application Ser. No. 14/181,643, entitled Multiple-Input-Multiple-Output (MIMO) Communication System, filed Feb. 15, 2014, the disclosure of which is hereby incorporated by reference in its entirety. In this manner, the output signal 46 may take the same form as the input signal 44 prior to being processed with the first signal processor 12. Optionally, the second signal processor 48 may be configured to generate the output signal 46 as a different type of signal. The signal 46 as it comes out of signal processor 48 may not be frequency or spatially diverse, e.g., signal 46 may need another processor like 12 to regenerate back spatial or frequency diverse signals. This would most likely be to implement a home "LTE over HFC" network that extends from the larger coverage LTE over HFC access network. Another way of extending frequency or spatially diverse signals may include using an end station similar to end station 40 and converting to spatially or frequency diverse signals without use of a signal processor similar to the processor 48. The second signal processor 48 may be configured to assess the signaling capabilities of the first UE 38 and to adjust the characteristics of the output signal 46 to operate with the capabilities of the first UE 38.

The first signal processor 12 may include a codeword multiplexing device 52. The codeword multiplexing device 52 may be configured to multiplex the input signal 44 into a plurality of signal parts 54, 56, 58, 60. The codeword multiplexing device 52 is shown to be configured for non-limiting purposes to multiplex the input signal 44 into a first signal part 54, a second signal part 56, a third signal part 58 and a fourth signal part 60. The codeword multiplexer 52 may be configured to facilitate encoding the signal parts 54, 56, 58, 60 in/with codewords in order to enable additional robustness through addition of parity information. The codeword multiplexing device 52 may add extra bits to each signal part 54, 56, 58, 60 to increase robustness and the capability to reconstruct the original signal in case bits from one or more of the signaling parts 54, 56, 58, 60 are lost during communication. In a very benign environment, processing provided by the codeword multiplexing device 52 may be foregone, however, many applications, and in particular in MIMO, may practically require the additional robustness provided with the codewords. The use of four signal parts 54, 56, 58, 60 is believed to be beneficial as the particular implementation contemplates facilitating MIMO operations where the split parts correspond to four independent antenna ports. The codeword multiplexing device 52 may be configured to divide the input signal 44 into each of the signal parts 54, 56, 58, 60 such that each signal part 54, 56, 58, 60 carries at least a different portion of the input signal 44.

The signal processor 12 may include a plurality of modulation mapping devices 62, 64, 66, 68. The modulation mapping devices 62, 64, 66, 68 may be configured to format a received one of the first, second, third and fourth signal parts 54, 56, 58, 60 with respect to a constellation symbol. The mapping devices 62, 64, 66, 68, for example, may take a digital stream and convert that information into coordinate values defining different constellation symbols. The constellation symbols may correspond with a transport mechanism used within the communication system 10 to facilitate scheduling long-haul transmissions over the wireline communication 34, such as the constellation symbols associated with the MAP disclosed in U.S. patent application Ser. No. 12/954,079, the disclosure of which is hereby incorporated by reference in its entirety. In this manner, the modulation mapping devices 62, 64, 66, 68 may be configured to facilitate manipulating the data received from the codeword multiplexer 52 for actual transmission within the system 10. The modulation mapping devices 62, 64, 66, 68 may be configured to map or otherwise associate the bits/bytes output from the codeword multiplexer 52 with particular time periods and/or frequencies or other coordinates associated with transmission through the communication medium 34.

The signal processor 12 may include a plurality of orthogonal frequency division multiplexing (OFDM) processing devices 70, 72, 74, 76 (even though OFDM processing devices are included here as an example, other type of multicarrier or single carrier processing devices may be used). The OFDM processing devices 70, 72, 74, 76 may be configured to facilitate transmission of the received one of the first, second, third and fourth signal parts 54, 56, 58, 60 over a plurality of subcarriers. The OFDM processing devices 70, 72, 74, 76 may be configured to facilitate transmitting each signal part 54, 56, 58, 60 using an independent one of multiple narrowband subcarriers. The constellation symbol resulting from the modulation mapping devices 62, 64, 66, 68 may be used to define a plurality of values to which the particular subcarriers may be mapped. The use of multiple narrowband subcarriers may be beneficial in certain radio frequency environments compared to a single wideband carrier implementation. In principle, wideband carriers can also be used to carry frequency or spatially diverse information, however, the example of multiple narrowband subcarriers is used based on the likely environmental characteristics allowing it to provide better performance. The OFDM processing devices 70, 72, 74, 76 may be configured to translate a theoretical mapping provided by the modulation mapping devices 62, 64, 66, 68 for each signal part 54, 56, 58, 60 into actual signaling streams (spectrum) having specific parameters that will govern how the corresponding signals are actually transmitted beyond the signal processor 12. In this manner, the OFDM processing devices 70, 72, 74, 76 may be configured to map binary representations associated with the modulation mapping devices 62, 64, 66, 68 to the actual spectrum (e.g., signals received by the converter devices 80, 82, 84, 86).

The signal processor 12 may include a plurality of converter devices 80, 82, 84, 86. The converter devices 80, 82, 84, 86 may be configured to convert signaling associated with a received one of the first, second, third and fourth signal parts 54, 56, 58, 60 from a received frequency to a desired output frequency. The converter devices 80, 82, 84, 86 are shown to convert each of the first, second, third and fourth signal parts 54, 56, 58, 60 to a different frequency, which are correspondingly illustrated as a first frequency (F1), a second frequency (F2), a third frequency (F3) and a fourth frequency (F4). The conversion of each signal part 54, 56, 58, 60 output from the codeword multiplexing device 52 into a different frequency may be useful in providing frequency diversity. The frequency diversity enable the simultaneous transmission of multiple frequency multiplexed signals over medium 34, and thereby may allow more data to be transmitted than multiple spatially multiplexed signals over medium 110. Almost ideal or true orthogonality or diversity may be achieved over the HFC environment while spatial diversity over the wireless medium is not as efficient.

Figure 3:
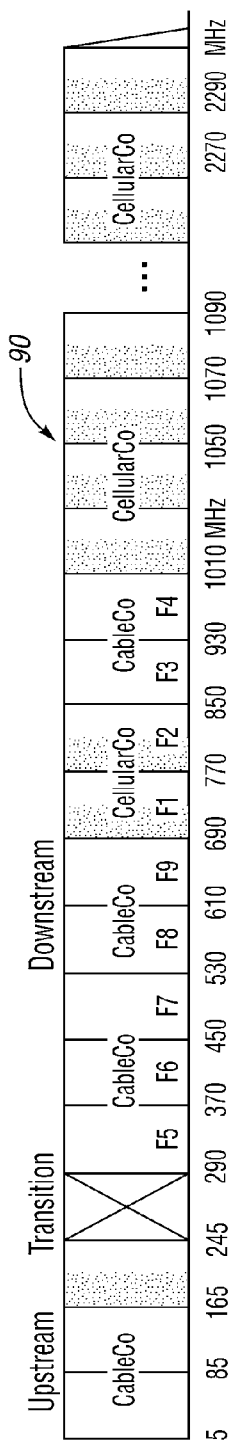
FIG. 3 illustrates a frequency selection map in accordance with one non-limiting aspect of the present invention.

FIG. 3 illustrates a frequency selection map 90 in accordance with one non-limiting aspect of the present invention. The frequency conversion map 90 may be used to facilitate selection of the frequency conversion performed with the signal processor converters 80, 82, 84, 86. The frequency selection map 90 may include a plurality of frequency intervals assigned to facilitate upstream and downstream transmissions within the communication medium 34. An additional interval of frequencies may be set aside as a transition boundary between upstream and downstream related frequencies in order to prevent fall off or other interferences between the upstream/downstream frequencies. The mapping table is shown to include a feed reference (F1, F2, F3, F4, F5, F6, F7, F8, and F9) within each one of the downstream intervals in order to illustrate certain frequency ranges set aside for particular feeds 14, 16, 18. One non-limiting configuration of the communication system 10 contemplates nine feeds being simultaneously transported downstream through the communication mediums without interfering with each other.

Each of the potentially supportable feeds 14, 16, 18 may be assigned to a particular one of the intervals depending on a mapping strategy, licensing strategy or other operational requirements. The frequencies of each feed 14, 16, 18 may be determined by an originator of the corresponding input signal 44. The signal processor 12 may identify the originator from additional information received with the corresponding input signal 44 in order to facilitate identifying which portion of the mapping table 90 has been allocated to support signal transmissions of that originator. A first interval of the downstream frequency spectrum ranging from 690-770 MHz has been allocated to support signaling associated with the originator of the first feed 14. A second interval the downstream frequency spectrum ranging from 770-850 MHz has been allocated support signaling associated with the originator of the second feed 16. The corresponding intervals of the downstream frequency spectrum allocated to the other feeds 18 as shown with reference to one of the illustrated F3, F4, F5, F6, F7, F8 and F9 designations.

When processing the first feed 14, the converter devices 80, 82, 84, 86 assigned to facilitate conversion of each corresponding signal part 54, 56, 58, 60 may be configured to select four different output frequencies from within the corresponding interval of the selection map, i.e., within 690-770 MHz. The particular frequency selected for each converter 80, 82, 84, 86 from within the 690-770 MHz interval may be determined in order to maximize a center frequency spacing, e.g., the first frequency (F1) may correspond with 710 MHz, the second frequency (F2) may correspond with 730 MHz, the third frequency (F3) may correspond with 750 MHz and the fourth frequency (F4) may correspond with 770 MHz. The intervals in the selection map 90 may be tailored to the particular center frequency offset in order to facilitate desired frequency spacing, which for exemplary non-limiting purposes has been selected to correspond with 20 MHz. The signal processor 12 may include a separate set of devices to support simultaneous transmission of the second feed 16 whereby the corresponding converters may be configured to output the signal parts associated with the second feed at 790 MHz, 810 MHz, 830 MHz and 850 MHz. (The devices used to support the additional feeds are not shown however they would duplicate the devices illustrated in FIG. 2 with additional duplicates optionally being included to support additional feeds.)

The signal processor 12 may include a combiner 92 configured to receive the signal parts 54, 56, 58, 60 from the converter devices 80, 82, 84, 86 as well as other signal processors as described here or from other processors from other services carried over the CATV networks. The combiner 92 may be configured to aggregate the received frequency diverse signals for transport over the communication medium 34. The combiner 92 may be configured to prepare the received first, second, third and fourth signal parts 54, 56, 58, 60 for transmission to a laser transmitter (see optical transmitter/receiver (opt. Tx/Rx) in FIG. 1) to facilitate subsequent modulation over an optical medium and/or for transmission directly to a hybrid fiber coaxial (HFC) or other wired communication medium 34. The laser transmitter may be configured to receive the signaling (h11, h22, h33, h44) from the combiner 92 as a single/common input to be subsequently modulated for transport over one or more of the fibers and/or coax portions of the communication medium 34. The communication medium 34 may be used to facilitate long-haul transport of the signal parts 54, 56, 58, 60 for subsequent receipt at the first end station 22. This type of long-haul transport of frequency diverse signaling, derive from processing the non-frequency diverse signaling received at the input 44 to the signal processor, may be helpful in maximizing signaling throughput.

The second signal processor 48 may include a processor, a plurality of down-converter devices, a plurality of OFDM processing devices or alternative multicarrier or single carrier processing devices, a plurality of modulation de-mapping devices and a codeword de-multiplexing device. These devices may be configured to facilitate inverse operations to those described above with respect to the signal processor 12 in order to facilitate generating the output signal 46. While the signal processors 12, 48 are described with respect to including various devices to facilitate the contemplated signal transmission, the signal processors 12, 48 may include other electronics, hardware, features, processors, or any other sufficient type of infrastructure having capabilities sufficient to achieve the contemplated signal manipulation. The first end station 22, in particular, may include an output port or other interface to facilitate communication of the output signal 46 to the first UE 38. In this manner, the communication system 10 may be configured to facilitate wireline signaling between the signal processor 12 and the first end station 22. FIG. 2 describes signaling corresponding with a downstream direction for exemplary purposes as an equivalent but inverse set of components going in the uplink direction may be included to facilitate similar processes in a reverse or inverse order to facilitate upstream signaling.

Figure 4A:
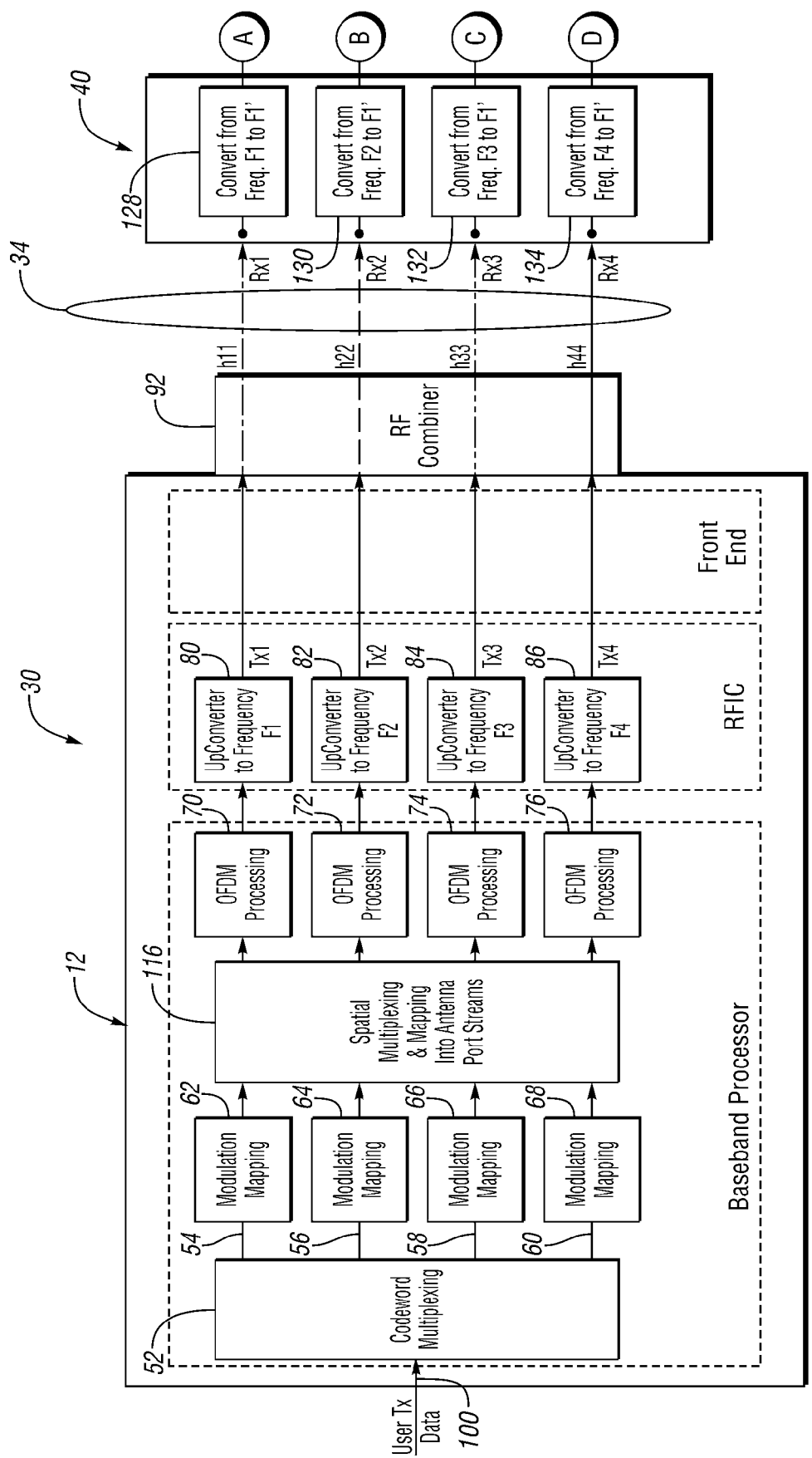
FIGS. 4a-4b schematically illustrate operation of the communication system when facilitating a wireless signaling mode in accordance with one non-limiting aspect of the present invention.
Figure 4B:
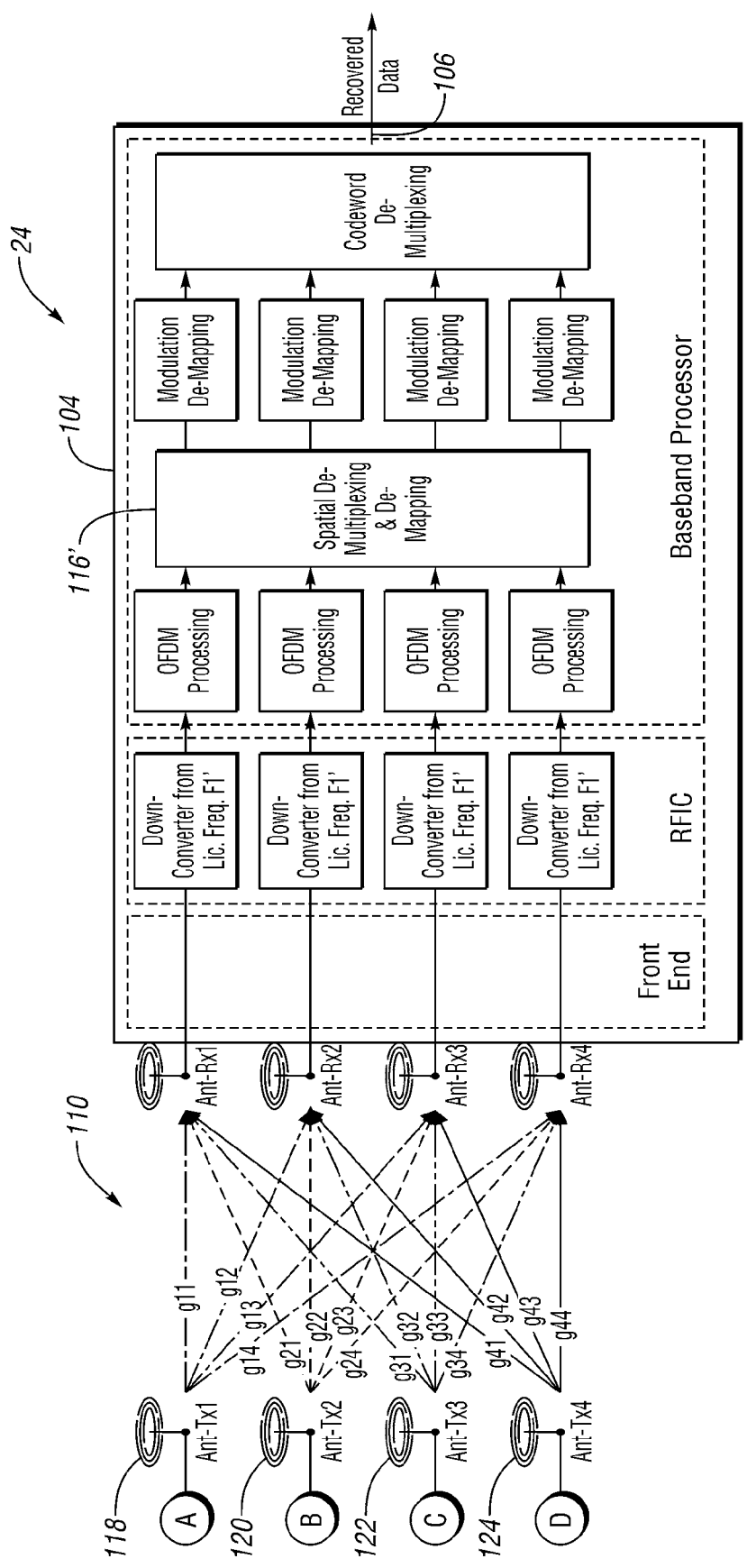

FIGS. 4a-4b schematically illustrate operation of the communication system 10 when facilitating wireless signal in accordance with one non-limiting aspect of the present invention. The wireless signaling may be similar to the signaling described with respect to FIG. 2 in that an input signal 100 received at the first signal processor 12 is converted to an intermediary signal (combined into a single/common output to laser transmitter, which is shown for exemplary purposes as having four equivalent parts—h11, h22, h33, h44) for transmission to a second signal processor 104 for conversion to an output signal 106. The illustration associated with FIG. 4 differs from that in FIG. 2 at least in that the intermediary signal traverses at least part of the distance between the first and second signal processors 12, 104 through a wireless medium 110. In particular, FIG. 4 illustrates a scenario where the intermediary signal is transmitted initially through the wireline communication medium 34 and thereafter through the wireless communication medium 110, which may correspond with a signal traveling from the headend unit 30 through the third end station 40 for wireless receipt at the second end station 24 (see FIG. 1).

The configuration shown in FIG. 4 may have many uses and applications, including supporting cellular telephone services, or other services that are at least partially dependent on wireless or RF signaling, such as where a provider desires to obtain certain benefits associated with transporting signaling at least partially through the wireline communication medium 34. The ability to at least partially rely on the wireline communication medium 34 may be beneficial in facilitating long-haul transport of the corresponding signaling (intermediary signal) in a manner that maximizes throughput and minimizes interference or other signaling loss that may otherwise occur if transmitted solely through wireless mediums. The third end station 40 may be included between the first and second end stations 22, 24 to facilitate interfacing the wireline communication medium 34 with the wireless communication medium 110. Optionally, the third end station 40 may be positioned as close to the second end station 24 as possible in order to maximize use of the wireline communication medium 34 and/or the third end station 40 may be included as part of the first end station 22 in order to maximize wireless communication.

The first and second signal processors 12, 104 shown in FIG. 4 may be configured similarly to the corresponding signal processors shown in FIG. 2. The elements illustrated in FIG. 4 with the same reference numerals, unless otherwise noted, may be configured to perform in the same manner as those described above with respect to FIG. 2. The first and second signal processors 12, 104 of FIG. 4 may include an additional device to facilitate supporting the at least partial wireless communication, which is referred to as a spatial multiplexing and mapping device 116 and its corresponding inverse 116'. The spatial multiplexing device 116 may be configured to facilitate spatial diversity of the signal parts output from the modulation mapping devices 62, 64, 66, 68. The spatial multiplexing and mapping device 116 may be configured to add delay to one or more of the signal parts 54, 56, 58, 60 or modify these signal parts in different ways in order to facilitate spatially separating each signal part 54, 56, 58, 60 from one another. This may be beneficial in order to enhance the spatial diversity of antennas 118, 120, 122, 124, which may be individually used to transmit the signal parts 54, 56, 58, 60.

The third end station 40 may be configured to receive the frequency diverse signaling output from the combiner 92. The third end station 40 may include converter devices 128, 130, 132, 134 or additional features sufficient to facilitate converting the received frequency diverse signaling to spatially diverse signaling. The third end station 40 may include one converter device 128, 130, 132, 134 for each of the received signal parts, i.e., a first converter 128 for the first signal part 54, a second converter 130 for the second signal part 56, a third converter 132 for the third signal part 58 and a fourth converter 134 for the fourth signal part 60. Each converter 128, 130, 132, 134 may be configured to convert the frequency of the received signal part to a common frequency in order to translate frequency diversity over medium 34 to spatial diversity over medium 110. The common frequency may correspond with a frequency licensed by an originator of the input signal 100, e.g., wireless frequency ranges purchased by cell phone service providers and/or another frequency range otherwise designated to be sufficient to facilitate subsequent wireless transmission to the second end station 24. The second end station 24 may include a separate antenna and separate active converter devices for each of the spatially diverse signal it receives in order to facilitate spatially receiving the signal parts to the second UE. FIG. 4 describes signaling corresponding with a downstream direction for exemplary purposes as an equivalent but inverse set of components going in the uplink direction may be included to facilitate similar processes in a reverse or inverse order to facilitate upstream signaling.

Figure 5A:
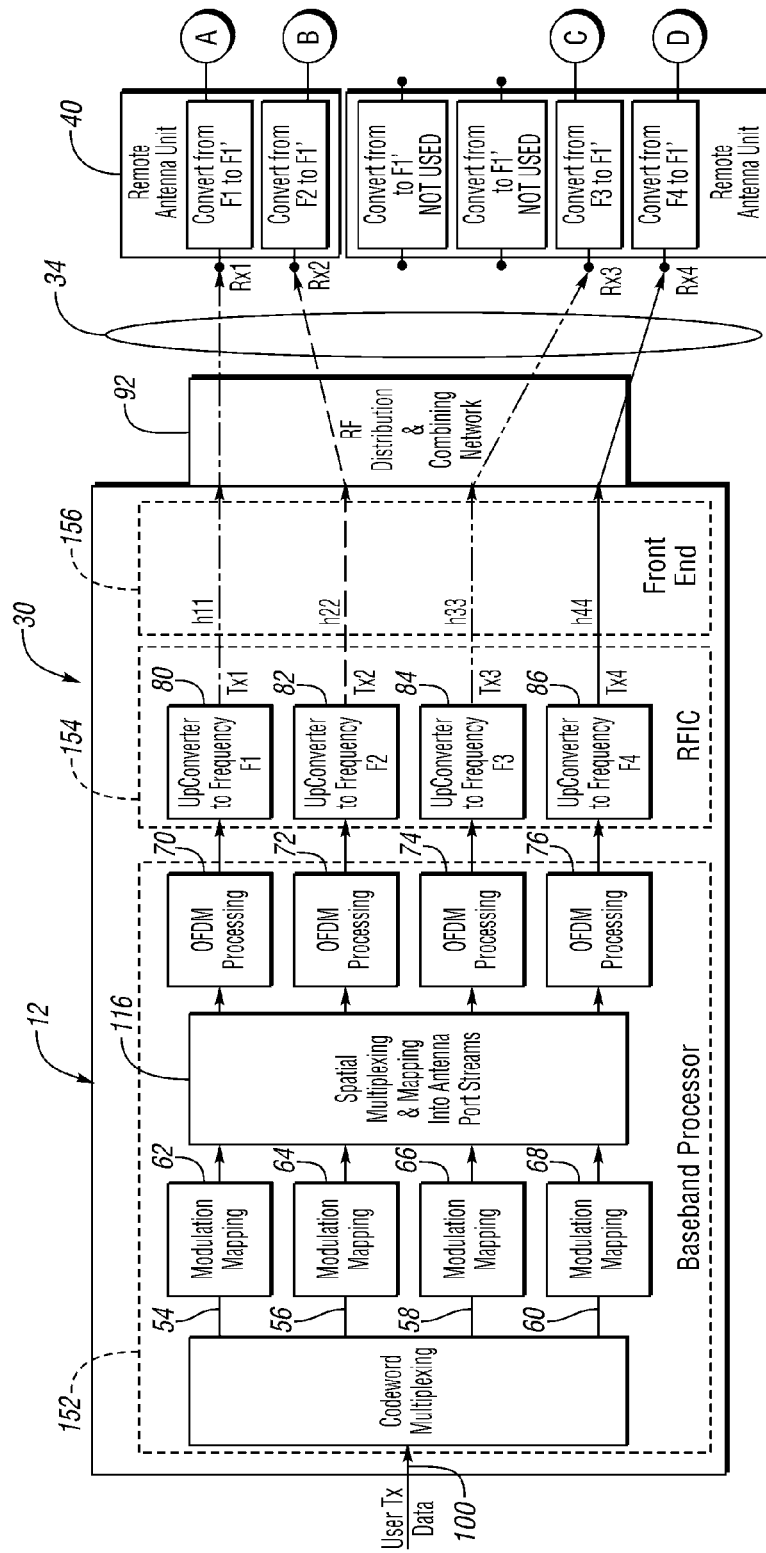
FIG. 5a-5b schematically illustrates operation of the communication system when facilitating wireless signaling having enhanced spatial diversity in accordance with one non-limiting aspect of the present invention.
Figure 5B:
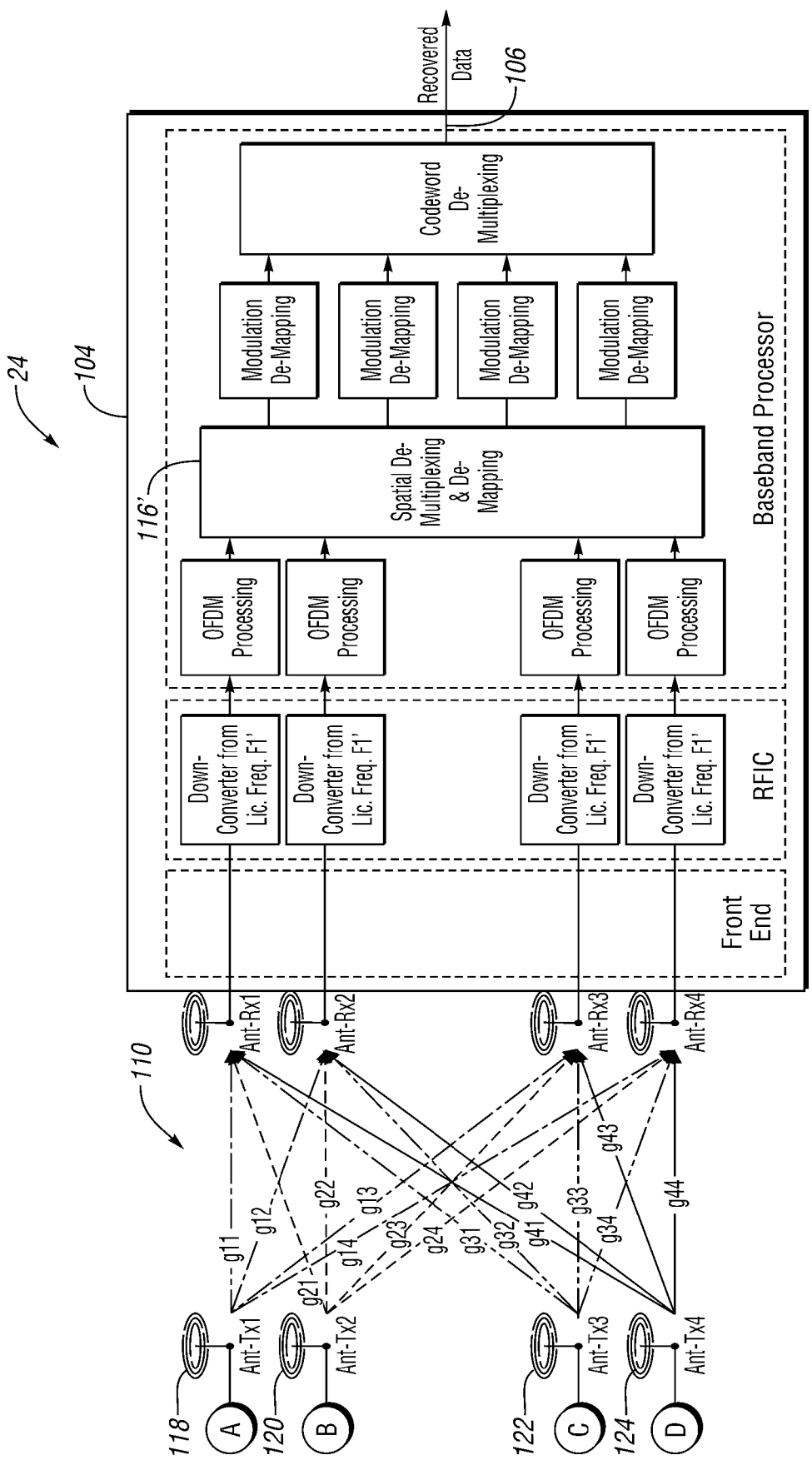

FIGS. 5a-5b schematically illustrates operation of the communication system 10 when facilitating wireless signaling having enhanced spatial diversity in accordance with one non-limiting aspect of the present invention. The wireless signaling may be similar to the signaling described with respect to FIGS. 2 and 4 at least in that the input signal 100 received at the first signal processor 12 is converted to an intermediary signal (combined into a single/common output to laser transmitter shown for exemplary purposes as having four equivalent parts—h11, h22, h33, h44) for transmission to the second signal processor 104 where it is then converted to the output signal 106. The illustration associated with FIG. 5 differs from that in FIG. 4 at least in that the intermediary signal traverses at least part of the distance between the first and second signal processors 12, 104 through the wireless medium 110 by way of two remote antenna units instead of one. FIG. 5 illustrates a scenario where the intermediary signal is transmitted initially through the wireline communication medium 34 and thereafter through the wireless communication medium 110, which may correspond with signaling traveling from the headend unit 30 through the third end station 40 and the fourth end station 42 for wireless receipt at the second end station 24 (see FIG. 1). FIG. 5 provides enhanced spatial diversity for the wireless signals due to the third end station 40 being at a location physical different from or spatially distinct from the fourth end station 42.

One non-limiting aspect of the present invention contemplates the third and fourth end stations 40, 42 being physically spaced apart in order to enhance the spatial diversity of the wireless signals transmitted therefrom, at least in comparison to the wireless signaling shown in FIG. 4 to be transmitted solely from the third end station 40. The fourth end station 42 is shown to be connected to a different trunk, cable, fiber line, etc. than the third end station 40 in order to demonstrate the ability of the signal processor 12 to transmit signals to the second end station 24 using multiple, frequency diverse portions of the wired communication medium 34. The signal processor 12 may be configured to select from any number of end stations when determining the two or more end stations desired to communicate wireless signaling with the second end station. The two or more end stations may optionally included another end station that may be closer to the second end station and/or connected to the same trunk or feed, such as but not limited to a fifth end station 140 (see FIG. 1). In this manner, the signaling desired for receipt at the second end station may commonly originate from the signal processor and thereafter traverse different portions of the wired communication medium 34 and the wireless communication medium 110 prior to being re-joined and commonly received at the second end station 24. FIG. 5 describes signaling corresponding with a downstream direction for exemplary purposes as an equivalent but inverse set of components going in the uplink direction may be included to facilitate similar processes in a reverse or inverse order to facilitate upstream signaling.

Figure 6A:
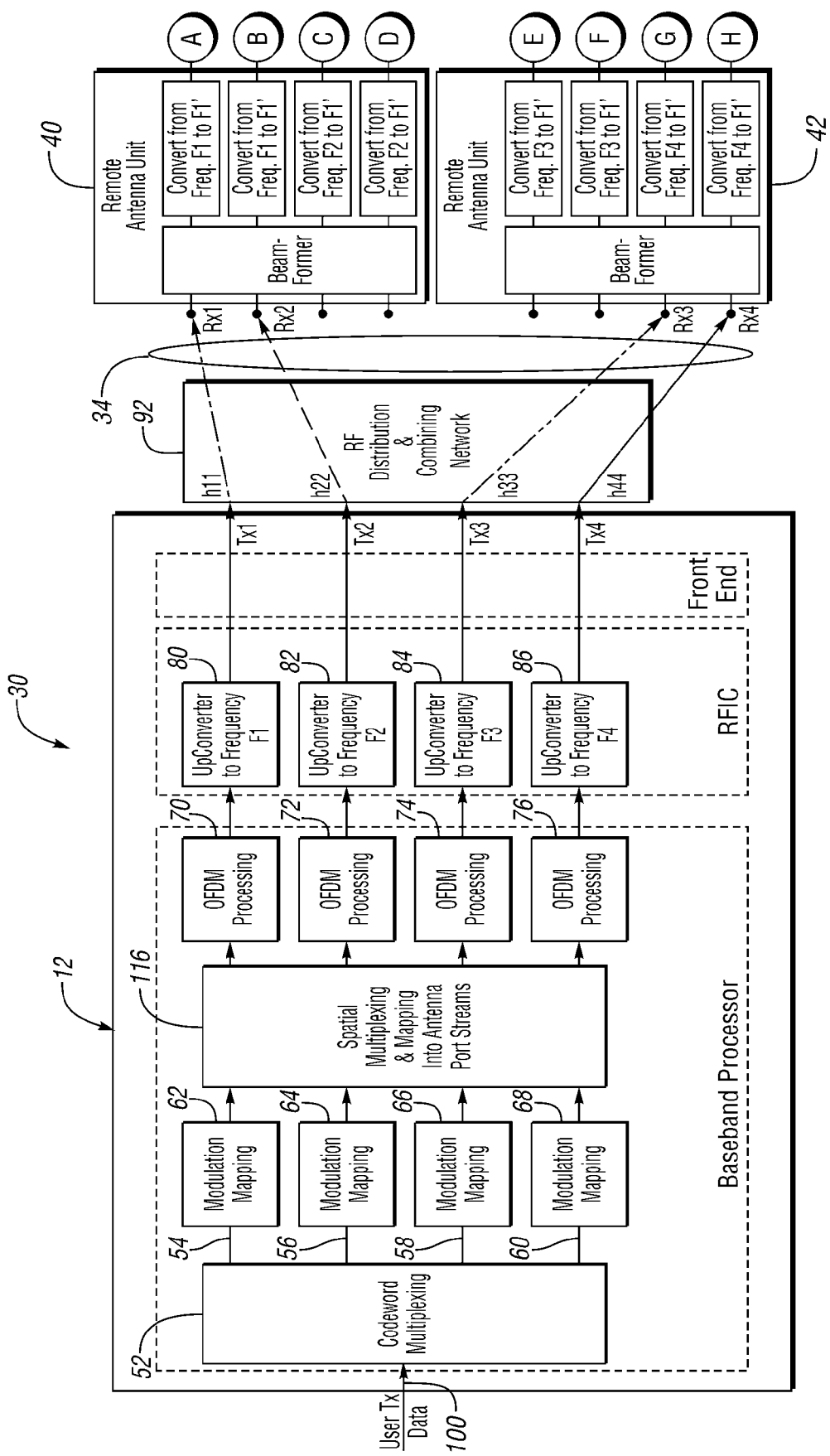
FIG. 6a-6b schematically illustrates operation of the communication system when facilitating wireless signaling having enhanced spatial diversity in accordance with one non-limiting aspect of the present invention.
Figure 6B:
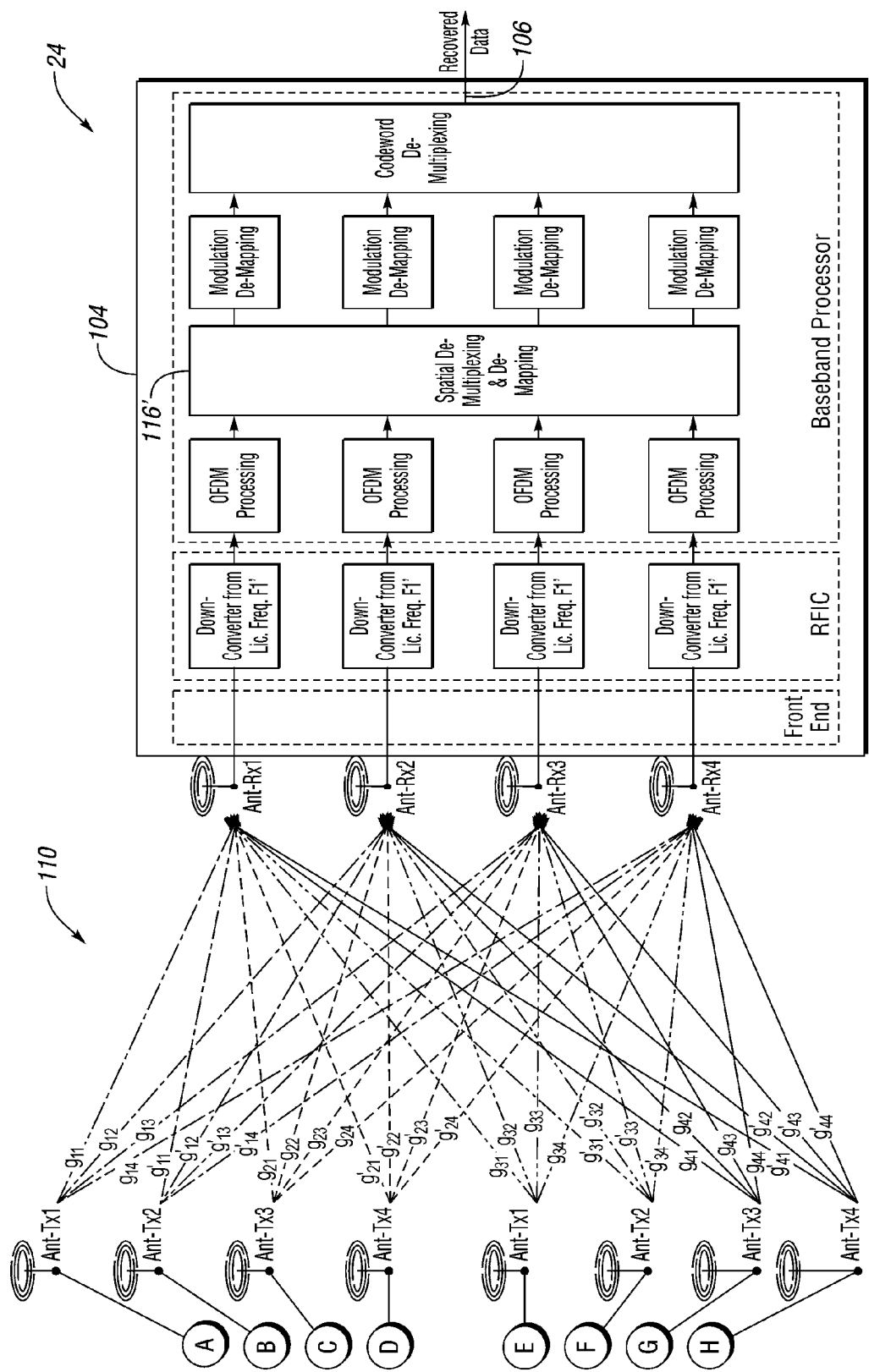

FIGS. 6a-6b schematically illustrates operation of the communication system 10 when facilitating wireless signaling having enhanced spatial diversity with beamforming in accordance with one non-limiting aspect of the present invention. The wireless signaling may be similar to the signaling described with respect to FIGS. 2, 4 and 5 at least in that the input signal 100 received at the first signal processor 12 is converted to an intermediary signal (combined into a single/common output to laser transmitter shown for exemplary purposes as having four equivalent parts—h11, h22, h33, h44) for transmission to the second signal processor 104 where it is then converted to the output signal 106. The illustration associated with FIG. 6 differs from that in FIG. 5 at least in that the intermediary signal traverses at least part of the distance between the first and second signal processors 12, 104 through the wireless medium 110 using beamforming. FIG. 6 illustrates a scenario where the intermediary signal received at each of the first and second end stations 40, 42 is replicated with beamformers such that duplicate signals are output to addition ports for use in transmitting four wireless signals. The additional wireless signals may be replicated with phase, delay or amplitude adjustments sufficient to facilitate beamforming. FIG. 6 describes signaling corresponding with a downstream direction for exemplary purposes as an equivalent but inverse set of components going in the uplink direction may be included to facilitate similar processes in a reverse or inverse order to facilitate upstream signaling.

The signal processor 12 may be configured to facilitate MIMO related signaling by processing an input signal into multiple, frequency diverse signals (e.g., h11, h22, h33, h44) particularly suitable for transmission over an HFC infrastructure. Following transmission over the HFC infrastructure, the signals may optionally be processed for further wireless transport, such as by converting the frequency diverse, MIMO related signals to a common frequency prior to facilitating wireless transmission. Spatial diversity may be facilitated on the frequency converted signals sharing the common frequency by adding delay and/or other adjustments and transformations, i.e., signals carried over the HFC infrastructure, and/or by directing different portions of the MIMO signals derived from the same input signal to different, spatially diverse remote antenna units 40, 42 before wireless transport. Optionally, the frequency diverse, MIMO signals may be transmitted to different types of remote antenna units or remote antenna units having different transmission capabilities, e.g., FIG. 5 illustrates the third and station 40 having two converters and two antenna ports and the fourth end station 42 having four converters and four antenna ports.

The remote antenna units 40, 42, or more particularly the converters associated therewith, may be configured to convert received signaling for transport over corresponding antennas ports. Each antenna port may be configured to transmit one of the converted, MIMO signals (h11, h22, h33, h44), effectively resulting in transmission of multiple signals, e.g., signal h11 effectively produces multiple signals g11, g12, g13, g14 due to signal h11 being received at multiple antenna ports included on the receiving user equipment 24. The remote antenna units 40, 42 may be configured to simultaneously emit multiple MIMO signals, such as MIMO signals associated with different feeds and/or MIMO signals intended for receipt at other usual equipment besides the illustrated user equipment 24. The remote antenna units 40, 42 may include capability sufficient to facilitate beamforming or otherwise shaping wireless signals emitted therefrom, such as to in a manner that prevents the beams from overlapping with each other or unduly interfering with other transmitted signaling. The beamforming may be implemented using multiple antenna arrays or selection of antennas ports associated with each of the illustrated antennas, such as according to the processes and teachings associated with U.S. patent application Ser. No. 13/922,595, the disclosure of which is hereby incorporated by reference in its entirety.

Figure 7:
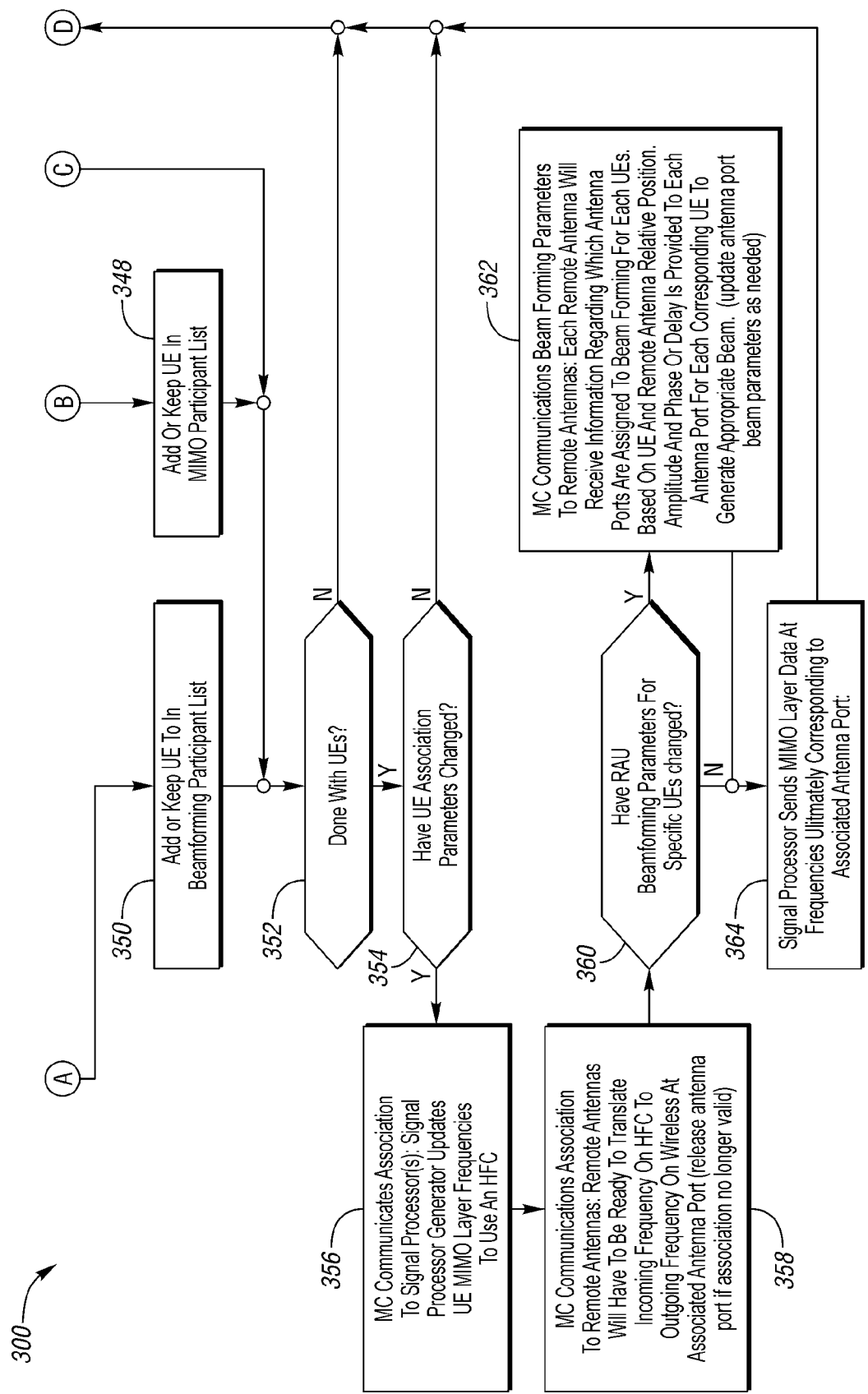
FIG. 7 illustrates a flowchart of a method for transporting signals in accordance with one non-limiting aspect of the present invention.

FIG. 7 illustrates a flowchart 300 of a method for transporting signals in accordance with one non-limiting aspect of the present invention. The method may be embodied in a non-transitory computer-readable medium, computer program product or other construct having computer-readable instructions, code, software, logic and the like. The instructions may be operable with an engine, processor or other logically executing device of the remote antenna unit and/or another one or more of the devices/components described herein to facilitate controlling the signaling processor and/or the other devices/components in the manner contemplated by the present invention to facilitate delivering wireless signaling (e.g., a master controller). The method is predominately described for exemplary non-limiting purpose with respect to at least a portion of the wireless signaling, or corresponding intermediary signaling, being long-hauled carried over a wired and/or wireline communication medium, such as but not necessarily limited to cable or hybrid-fiber coax (HFC) network. The long-haul or intermediary signaling may be facilitated with processing or other controls performed with the signal processor to provide wired transport over a greater distance than the eventual wireless signaling transport, thereby leverage off of the economies associated with wired transport while also facilitating interactions with wireless devices (e.g., a powerful signal processor in a centralized location with de-centralized, less powerful or less expensive remote antenna units).

Block 302 relates to scanning for user equipment (UE) using single remote antenna unit sectors. The remote antenna unit sectors may correspond with wireless areas covered by remote antenna units (and stations) having capabilities sufficient to facilitate receiving the wireline transported signal and thereafter converting the received signals to wireless signals. The scanning may be performed to identify one or more pieces of user equipment, referred to hereinafter as devices, desiring to receive wireless signals following transport over the wireline communication medium and/or to transmit wireless signals for subsequent transport over the wireline communication medium. The scanning may be performed on a per signal processor basis in order to facilitate processing an input signal intended for transport over a wireline communication medium and final/initial transport over a wireless communication medium The method is predominantly described with respect to downlink or downstream signaling where the input signal originates at a signal processor and is eventually received at one of the devices for exemplary non-limiting purposes as the present invention fully contemplates similar processing and operations being performed to facilitate uplink or upstream signals, i.e., wireless signals originating from one of the devices. The scanning may identify devices desiring signal transport and the signal processors associated with facilitating the related signaling.

Block 304 relates to rating remote antenna unit sector connectivity quality on a per device basis to identify the remote antenna units having capabilities sufficient to facilitate wireless signaling with one or more of the devices. The ratings may be organized or tabulated in order to associate each device with one or more remote antenna units having or lacking connectivity quality sufficient to facilitate wireless signaling therewith. The ratings may be based on networking signals or other wireless signals exchanged between the devices and the remote antenna units as part of a handshake operation or other operation related to gaining access to a wireless network or wireless service area associated with each remote antenna unit (the wireless service area/network of each remote antenna unit may overlap to define a larger wireless medium). The connectivity quality may be based on relative signal strength indicators (RSSI) or other factors related to signal quality, integrity, or other influences on the ability of the device to facilitate wireless signaling with one or more remote antenna units. The connectivity quality may be assessed on a pass/fail basis such that the remote antenna units having capabilities sufficient to facilitate wireless connectivity with one or more devices may be identified and those lacking sufficient connectivity may be omitted, at least until a device moves within range or otherwise improves its transmit capabilities (e.g., greater power or gain, less interference, etc.). The results may be tabulated for each device for subsequent use in identifying remote antenna unit(s) available as candidates to facilitate the contemplated wireless signaling.

Block 306 relates to determining capabilities or other characteristics for the devices desiring wireless signal exchange. The device capabilities may include assessing MIMO capabilities (e.g., whether the device has multiple antennas or an antenna array configurable to facilitate receiving multiple wireless signals), latitude and longitude (lat-long), antenna type or characteristics, power capabilities, beamforming suitability, etc. The device capability assessment may generally relate to determining controllable parameters and/or limitations of the devices in order to facilitate configuring the remote antenna unit(s) to operate in a manner commiserate with desired wireless performance (e.g., in some cases it may be desirable to assess performance relative to signal integrity and in other cases it may be desirable to assess performance relative to signal range, power, etc.). Depending on the desired performance or other operational constraints, such as but not necessary limited to wireless capacity and/or signal rates available to the devices, certain capabilities of the devices may be assessed and/or related data may be requested from the devices. The present invention fully contemplates devices having any number of capabilities and/or operating characteristics such that any one of these characteristics may be assessed and used to facilitate subsequent wireless signaling therewith.

Block 308 relates to determining a mobility state of the devices. The mobility state may be determined to characterize whether the devices is static, semi-static or in motion. The latitude and longitude associated with each device may be periodically measured to determine whether the device falls within one of the static, semi-static or in motion states. The mobility states are described with respect to being one of static, semi-static or in motion for exemplary non-limiting purposes as the present invention fully contemplates assessing the ability of the devices according to any number of other states. The noted states are described in order to demonstrate three thresholds that may be useful in assessing whether the corresponding device is likely to remain in its current position (static), remain relatively close to its current position such that wireless signaling is likely to be unaffected or unlikely to require immediate change (semi-static) or likely to keep moving or begin moving such that wireless signaling may be affected, e.g., the remote antenna units needed to maintain continuous communication with the wireless device may change due to the wireless device being mobile. The mobility states or their corresponding thresholds may be based on capabilities of the signal processor and/or remote antenna units to change operating settings and/or signal transmissions, e.g., whether signals can be re-processed quickly enough over the wired communication medium to enable multiple remote antenna units to communicate with a moving device. The mobility state may be periodically re-assessed in order to facilitate changing mobility state determinations from one state to another state.

Block 310 relates to assessing remote antenna unit capabilities for the remote antenna units having devices within wireless range and/or likely to have devices within wireless range in the near future. The assessment of the remote antenna unit capabilities may be similar to the assessment performed with respect to the devices at least insofar as assessing the capabilities of the remote antenna units to facilitate wireless signaling. Block 310 also contemplates assessing spectrum resources/capabilities for the wired communication medium (HFC) and the signal processor(s) being associated therewith. These capabilities may influence the portions of the wired communication medium that may be available to transport signals, e.g., some portions of the wired communication medium from a bandwidth or frequency perspective may already be maximized and unable to support signal transport (the remote antenna units associated therewith may be eliminated as candidates). The frequency, bandwidth and other transport related characteristics of the wired communication medium and/or the signal processor(s) may influence a number of decisions made by the master controller or other entity tasked with monitoring system operations, including those associated with selecting the one or more remote antenna units to communicate with each of the devices and the signaling parameters to be used when facilitating transmission of the attendant signaling over the wired communication medium and/or the wireless communication medium.

Block 312 relates to associating the devices identified in Block 302 as desiring wireless signaling with one or more of the remote antenna units identified to be suitable candidates in Block 310. The association may be performed at a port-level or antenna-basis such that multiple remote antenna units may be associated with the same or multiple devices and/or individual antennas/ports on the remote antenna units and/or the devices may be associated with each other. The associations may correspond with selecting one or more remote antenna units identified as candidates for further use in communicating with each of the devices and associating the corresponding antennas/ports on the selected remote antenna units with a counterpart on the corresponding device, i.e., on a one-to-one-basis. The present invention contemplates any number of methodologies for determining the contemplated associations, including those that benefit one parameter over another, e.g., spatial diversity may be preferred over longevity and/or based on other limitations such as frequency availability, HFC spectrum, etc. may influence associations. The number of available remote antenna units may vary and the relationship of the remote antenna units relative to static or moving ones of the devices may also very such that the association determinations may be relatively dynamic and/or require frequent updates and/or adjustments in order to facilitate continuous signaling and/or to enable transmissions to complete.

Figure 8:
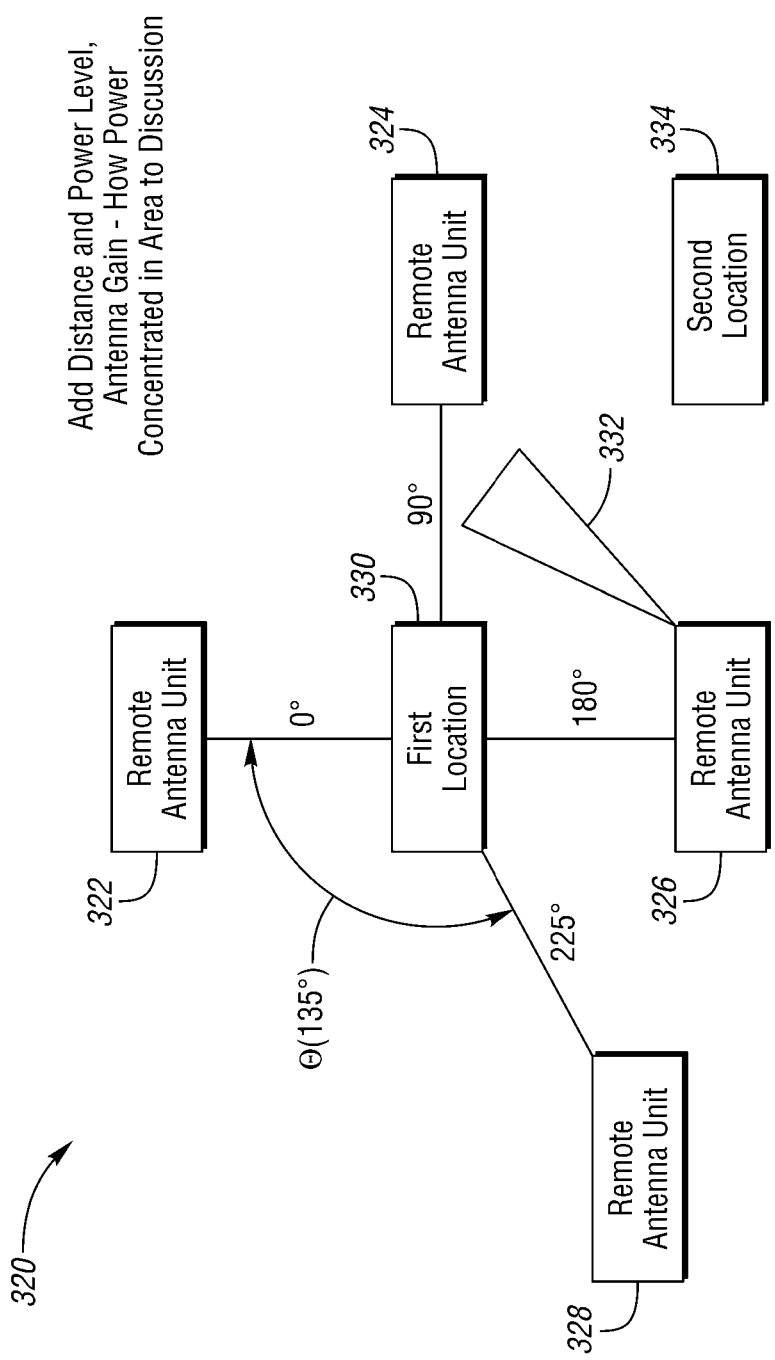
FIG. 8 illustrates a diagram showing spatial diversity as contemplated by one non-limiting aspect of the present invention.

One non-limiting aspect of the present invention contemplates facilitating the association and/or otherwise selecting the remote antenna unit(s) to be used in facilitating wireless communication with the devices based at least in part on spatial diversity. The spatial diversity may be characterized by relative spatial positioning of each remote antenna unit to each device it is selected to communicate with. When multiple remote antenna units are selected to communicate with a single device, performance may be improved by maximizing or otherwise ensuring sufficient spatial diversity of the remote antenna units relative to the single device. FIG. 8 illustrates a diagram 320 showing spatial diversity as contemplated by one non-limiting aspect of the present invention. The diagram 320 illustrates an exemplary scenario where four remote antenna units 322, 324, 326, 328 are determined to be candidates to facilitate communications with a single device located at a first location 330. The spatial diversity or spatial positioning of each remote antenna unit may be based on angular positioning relative to the first location 330. The angular positioning of the first remote antenna unit 322 is shown to correspond with 0°, the angular positioning of the second remote antenna unit 324 is shown to correspond with 90°, the angular positioning of the third remote antenna unit 326 is shown to correspond with 180° and the angular positioning of the fourth remote antenna unit 328 shown to correspond with 225°.

The master controller may assess these angular positioning values when selecting the one or more of the first, second, third and fourth remote antenna units 322, 324, 326, 328 to be used when facilitating communications with the device while at the first location 330. The master controller may then rely on the angular positioning values to assess spatial diversity with respect to the available remote antenna units 322, 324, 326, 328, and optionally based thereon, select the antennas 322, 328 to be used in facilitating wireless signaling with the first location 330. Depending on the number of remote antenna units 322, 324, 326, 328 available to facilitate the wireless signaling, any number of factors may be weighed when selecting the remote antenna units 322, 328. In the illustrated example, with four relatively evenly spaced remote antenna units being available, the selected antennas are shown for exemplary non-limiting purposes with respect to being the first and fourth remote antenna units 322, 328. The first and fourth remote antenna units 322, 328 may be selected for a number of reasons, such as based on the portion of the wired communication medium being used to deliver the corresponding signals having less bandwidth usage or less restrictions than the portion of the medium used to deliver signals to the second and/or third remote antenna units 324, 326, spectrum or bandwidth constraints on the second and/or third antennas 324, 326 limiting their use, etc. Optionally, particularly when multiple remote antenna units are available, a minimum or threshold of related angular positioning (Θ) may be used to facilitate the selection, e.g., a minimum threshold of 100° maybe used such that the remote antenna unit combinations having a similar path (small relative angle) are voided and remote antenna unit combinations at right angles are eliminated and/or the threshold may be adjusted depending on the number of available remote antenna units.

The remote antenna units 322, 328 selected to facilitate wireless signaling may also be determined based on operational considerations or capabilities of the remote antenna units 322, 324, 326, 328. The beamforming capabilities of the remote antenna units 322, 324, 326, 328 may be one type of operational consideration assessed when selecting the available remote antenna units to facilitate the wireless signaling. The beamforming capabilities may be assessed to determine whether the available remote antenna units 322, 324, 326, 328 can direct a beam 332 or otherwise focus wireless signaling towards the first location 330 to enhance performance. Optionally, the directions that the beam may be focused beyond the first location, i.e., whether the corresponding remote antenna unit 322, 324, 326, 328 is able to maintain a continuous beam or wireless signaling capabilities while the device moves from the first location 330 to a second location 334 may be considered as part of assessing the beamforming enhancements. Optionally, the beamforming considerations may be used in cooperation with the angular positioning/spatial diversity considerations such that the beamforming may be used as a tiebreaker when multiple remote antenna units 322, 324, 326, 328 are equally spaced and otherwise equally or approximately equally suitable to facilitate wireless signaling whereby the selected remote antenna units may be one or more having the better or preferred beamforming capabilities.

In addition to the beamforming and/or angular positioning based assessments, other criteria may be used to select the used remote antenna units from the available remote antenna units. Antenna port resources may be one factor considered to assess the suitable of each remote antenna unit as well as amount of traffic and concentration of wireless users to be assigned or already assigned to each remote antenna unit. If user congestion at specific remote antenna unit is greater than traffic expected from target amount of traffic then those remote antenna units may be desirable to eliminate or demote in ranking. Such traffic or congestion may be measured as amount of traffic compared to total capacity where traffic is measured or estimated as bits per second, optionally using a formula to pick four remote antenna units (desired number may vary) and then use congestion to move on to others if one of the four exceeds threshold. Other factors such as signaling power levels, the number of antenna elements, antenna arrays or ports available on each remote antenna unit, channel loading, spare antenna ports/elements and other factors may influence ability of certain remote antenna units to continue to provide desired levels of wireless signaling and/or the likelihood that certain remote antenna units are likely to experience greater, detrimental wireless signaling demand in the future.

FIG. 5 illustrates a scenario where two remote antenna units 40, 42 have been selected to facilitate enhanced 4×4 MIMO wireless communications using two ports on two spatially separated remote antenna units 40, 42. The four ports, labeled as Tx1, Tx2, Tx3, Tx4, may correspond with four ports selected from N remote antenna units based on a corresponding remote antenna unit selection metric. The remote antenna unit selection metric may be analyzed for multiple groups of N remote antenna units as selected from the available remote antenna units. The lowest valued or multiple ones of the lower valued remote antenna units determined as a function of the remote antenna unit metric may be used to determine an initial termination of N (i.e. two, four, etc.) remote antenna units. Each initial combination(s) may then be further analyzed using a MIMO matrix manipulation process described below prior to actually being instructed to facilitate the desired wireless signaling. The remote antenna unit metric may be based on the following formula:

remote antenna unit selection metric =

$$\sum_{i=1}^{N} \frac{d_i^2}{d_i P_{MAXi}} \left\{ \left| |\theta_i - \theta_{i-1}| - \frac{360}{N} \right| + \left| |\theta_{i+1} - \theta_i| - \frac{360}{N} \right| \right\}$$

where N=number of participating remote antenna units; i=remote antenna unit index, varies from 1 to N; $G_i$=the antenna gain for the $i_{th}$ remote antenna unit; $P_{MAXi}$=the maximum power that the $i_{th}$ remote antenna unit can transmit; $d_i$=the distance from the device desiring wireless signaling to the $i_{th}$ remote antenna unit; and $\theta_i$ is the angle in degrees indicating the direction from the device to the $i_{th}$ remote antenna unit (for the purpose of populating the summation, the angles may repeat in a circle around the device such that $\theta_{N+1}=\theta_1$ and $\theta_0=\theta_N$). The remote antenna unit selection matrix generates values for each combination of remote antenna units based on angular positioning as adjusted according to distance, gain and power such that a lower value represents a better candidate while also enabling lower values to be achieved even if angular positioning is not ideal, e.g., in the event a sufficient relationship exists between distance, gain and power. In this manner, some conditions may permit a device located farther away from the device to be a better candidate if the device has greater gain and power capabilities than a closer device.

Following the remote antenna unit selection matrix calculations, additional factors may be considered when determining which one or more of the remote antenna units are the best candidate for facilitating wireless communications with the device. This may include analyzing the transfer function for each remote antenna grouping having a metric sufficient to indicate their suitability to facilitate wireless communications. The transfer function of each data path $g_{i,j}$, where i is the index of each transmitting antenna and j is the index of each receiving antenna, may be used to determine the transfer function matrix and whether the degree of uncorrelation between data paths would allow effective multiplication of capacity as compared to a single-input and single-output (SISO) system. Relative to FIG. 5, the following transfer function, optionally including background noise term (No 1, No 2, etc.), may be used to facilitate determining whether the equation is solvable and multiplication of capacity compared to a single-input, single-output (SISO) system is feasible.

$$[Rx1, Rx2, Rx3, Rx4] = [Tx1, Tx2, Tx3, Tx4]\begin{bmatrix} g11 & g12 & g13 & g14 \\ g21 & g22 & g23 & g24 \\ g31 & g32 & g33 & g34 \\ g41 & g42 & g43 & g44 \end{bmatrix} + [No1, No2, No3, No4]$$

In case all data paths are not uncorrelated, this transfer function matrix reduces to a smaller rank matrix. The equation below shows a case where the data paths from three remote antenna units are correlated hence the rank of this matrix reduces from four to two and at most capacity would be the capacity of a SISO system multiplied by a factor of 2.

$$[Rx1, Rx2, Rx3, Rx4] = [Tx1, Tx2, Tx3, Tx4]\begin{bmatrix} h11 & h12 & h13 & h14 \\ h21 & h22 & h23 & h24 \\ h21 & h22 & h23 & h24 \\ h21 & h22 & h23 & h24 \end{bmatrix} + [No1, No2, No3, No4]$$

If the data path signal levels are not much greater than the noise levels, the limited signal-to-noise ratio (SNR) would result in lower order modulations. The signals from the four transmitter antenna ports of one four-port antenna may be given by Tx1, Tx2, Tx3 and Tx4. The signals received by a four port antenna in each of the antenna ports may be given by Rx1, Rx2, Rx3 and Rx4. The transfer function of these signals as they traverse a wireless medium may be represented by the matrix H.

$$H = \begin{bmatrix} g11 & g12 & g13 & g14 \\ g21 & g22 & g23 & g24 \\ g31 & g32 & g33 & g34 \\ g41 & g42 & g43 & g44 \end{bmatrix}$$

This transfer function may also be the MIMO matrix, which may be manipulated to verify transmission. The gij element of the matrix indicates the gain from the ith transmitter antenna port to the jth receiver antenna port. The signal that is received in the four-port antenna is given by:

$$[Rx1, Rx2, Rx3, Rx4] = [Tx1, Tx2, Tx3, Tx4]\begin{bmatrix} g11 & h12 & h13 & h14 \\ h21 & h22 & h23 & h24 \\ h31 & h32 & h33 & h34 \\ h41 & h42 & h43 & h44 \end{bmatrix} + [No1, No2, No3, No4]$$

Since it is likely that noise has been added at the receiver the No1, No2, No3 and No4 elements representing the added noise is included.

To evaluate which group/collection of different antenna ports from different remote antenna units provide the best performance, the MIMO matrix with information using the different antenna ports selected may be evaluated. This may include checking for potential groups of antenna ports that meet the angular selection criteria as explained above and then calculating the determinant of the MIMO matrix (H). If the determinant is zero, then the rank of the matrix is lower than the number of antenna ports and capacity is not optimal for the corresponding group/collection of antenna ports and another group should be selected. If the determinant is non-zero, then the rank is equal to the number of antenna ports, meaning for example that a four-antenna port transmitter and four-antenna port receiver can support 4×4 MIMO. Thereafter, a suitable MIMO configuration from the will number of antenna ports is known and a next determination can be made on the quality of that selection. The quality may be assessed as a singular value matrix from the MIMO matrix according to the resulting components of this diagonal matrix. The antenna port group with the highest summation of values (called singular values) may provide the group of antenna ports that can be chosen from a performance criteria perspective. Other criteria like antenna port availability, traffic, congestion can also play a role in selecting the group of antenna ports.

The process of associating the antennas/ports of the selected ones 322, 328 of the available remote antenna units with the corresponding antennas/ports of each serviced device, as noted above, may be based on any number of factors and/or variables. Once the corresponding associations are determined or set for a certain period of time, the master controller, signal processor or other entity may then provide instructions to the corresponding remote antenna units 322, 328 and devices to facilitate implementing the desired associations. This may include transmitting various pieces of information and data necessary to instruct the remote antenna units and devices to identify each other and to limit communications with the associated antennas/ports. In the case of beamforming, the instructions may also include beamforming instructions related to controlling or otherwise setting beamforming related parameters for the remote antenna units and devices relying on beamforming, such as by instructing the remote antenna units and devices regarding amplitude and phase or delay of wireless signaling emitted therefrom. The amplitude and phase or delay may be dynamically adjusted in order to facilitate maintaining a desired beam, e.g., to ensure the beams reach the desire devices without influencing neighboring remote antenna unit/devices, and/or to facilitate shifting or pointing the beam in different directions as the devices move.

Once the associations are made and the corresponding instructions are transmitted, the wireless signaling between the remote antenna units and the devices, as well as the corresponding long-haul transport over the wired communication medium, may commence. The master controller, signal processor or other entity associated with the single communications may periodically update the instructions and/or change associations as more devices require wireless signaling and/or as devices previously requiring wireless signaling no longer require wireless signaling in the manner contemplated by the present invention. The dynamic nature of a wireless environment may require essentially real-time adjustments in order to ensure operations taking place based on the wireless signaling continue uninterrupted, i.e., at a rate sufficient to enable a user conducting a cell phone call on one of the wireless devices to continue the cell phone call in an uninterrupted manner as the corresponding cell phone travels within the service area. The updated associations or other parameters may be made at a rate sufficient to enable the wireless signaling associated therewith to be shifting or disbursed too other ones of the remote antenna units other than the remote antenna units initially/originally tasked with establishing wireless signaling with the device. As noted below, additional processes may be implemented to facilitate assessing various operational considerations for the purposes of maintaining, creating and/or terminating wireless signaling or otherwise adjudicating capabilities of the remote antenna units and lessor devices to facilitate wireless signaling.

Block 340 relates to determining whether devices are qualified to participate in beamforming. The beamforming participation capabilities may assess whether new devices desiring wireless signaling support beamforming and/or whether existing wireless devices or devices having existing wireless signaling are able to continue with beamforming and/or to begin beamforming. Block 342 relates to determining one or more of the devices being unable to perform beamforming. The devices determined to be incapable of being forming may be removed from a list or other table used to recognize devices having beamforming capabilities, such as to eliminate the need to subsequently check the same devices for beamforming capabilities, e.g., the unique identifier of the device may be kept and cross-referenced with the lack a beamforming capability so that that device need not be checked again for beamforming related information. Block 344 relates to determining whether a device lacking beamforming capabilities is be able to participate in non-beamforming related MIMO, i.e., whether the devices able to facilitate spatially diverse wireless signal transport where multiple signal parts generated from a common signal are transported to the device at a common frequency. Block 346 relates to removing devices lacking such MIMO capabilities (devices lacking MIMO capabilities may be indicated with using a single remote antenna unit or non-MIMO signaling).

Block 348 relates to adding or keeping devices in a MIMO participation list in the event such devices are able to facilitate MIMO signaling and/or the MIMO related wireless signaling described herein. The MIMO participation list may be beneficial in identifying the devices and their related capabilities so that the operating characteristics of recorded devices need not necessarily be re-assessed when the device or other device that later attempts to establish new wireless signaling or other communications from the same location or location in proximity thereto. This capability may be particularly beneficial when wireless devices are repeatedly or frequently used in the same location or relative to the same remote antenna units in order to ameliorate the processing needed each time such devices attempt to establish new wireless signaling. Block 350 relates to updating the same table or generating a new table for the devices and/or remote antenna units having beamforming capabilities. The table may be used to keep track of various operational capabilities related to beamforming, optionally in addition to those related to non-beamforming characteristics. Block 352 relates to assessing whether any more devices require addition to the lists/tables and/or are in need of making with one or more of the available remote antenna units. Block 302 may be returned to for the purposes of adding additional devices identified as requiring wireless signaling. In the event no additional devices are detected, an assessment can be made at Block 354 as to whether the established parameters or other information associated with the establish wireless signaling requires updating.

Block 356 relates to determining a change in parameters necessitating a different association and/or adjusting parameters or settings associated with an established association. The associations may relate to those established in Block 312 between the remote antenna units and the devices and/or associations between the signal processor and the remote antenna units. The association between the remote antenna units and the devices may change for any number of reasons, such as in the event a device moves from one location to another, a device terminates signaling, antenna elements become available to support beamforming, etc. The association between the signal processor and the remote antenna units may change similarly for any number of reasons, such as in the event bandwidth becomes available over other portions of the wired communication medium, currently used portions of the wired communication medium are allocated to higher priority processes, a device moves from one portion of the service area to another portion such that signals must be carried over a different portion of the wired communication medium in order to reach an appropriate remote antenna unit, etc. The wired communication medium and the signaling transported there over may be continuously changing such that frequencies previously unavailable may become available and previously determined to be available may become unavailable due to scheduling considerations or other operational requirements. As such, the signal processor may frequently updated a MAP or other instructional set used to control signal delivery over the wired communication medium in response to such adjustments, e.g., the frequencies used over particular portions of the HFC may be periodically updated.

Block 358 relates to the master controller providing new associations and corresponding instructions, if necessary, to the remote antenna units and the communicating devices in accordance with the new associations or other changes made to the signal processor in Block 356. This may require the remote antenna units to be ready to translate incoming frequency on the HFC to outgoing frequency on the wireless mediums, and in some cases at an associated antenna port (an antenna port may be released if an association is no longer valid). The signal transport contemplated herein maybe facilitated with beamformed and/or non-beamformed wireless signaling such that the beamforming steps or processes described herein may be eliminated in the event the remote antenna units lack beamforming capabilities and/or it is otherwise desirable to eliminate the extra processing or other operational constraints and considerations associated with beamforming. Block 360 relates to determining whether the remote antenna unit supporting beamforming have experience conditions that may result in the need to change related operational settings. Block 362 may include the master controller communicating beamforming parameters to remote antenna units. The remote antenna units may receive information regarding which antenna ports are assigned to beamforming for each device. Based on the device and remote antenna unit relative positioning, amplitude and phase or delay may be provided to each antenna port to facilitate implementing the appropriate beam and/or updating antenna port beam parameters as needed.

Block 364 relates to the signal processor sending MIMO layer data at frequencies ultimately corresponding to associated antenna ports. This may include the single processor or master controller sending pilot signals or other signals independent of signal parts associated with the input signals desired for transport to the wireless devices. The ability to transmit such signals may be beneficial in enabling processing related communications to occur over established or pre-defined channels/frequencies so that new remote antenna units and/or new devices can be pre-programmed to perform hand-shake operations or to otherwise establish initial communications with the remote antenna units and/or single processors. As noted above, the method for transporting signaling contemplated by the present invention is described as including a plurality of steps, processes, considerations or other decisions. The present invention fully contemplates implementing signal processing in accordance with the foregoing without necessarily having to perform each of the specified operations and/or without performing the specified operations in the sequencer manner described above.

Optionally, the present invention contemplates integrating various rules or other processes with the foregoing determinations, including one or more of the following:

Rules for Signal Processor Selection: Select signal processor, based on traffic, signal processor congestion, spectrum availability, channel loading etc.

Rules for Antenna Selection: IF UE and remote antenna unit antennas support polarization multiplexing include option of 2 polarization multiplexed antenna ports from the same remote antenna unit. A 4×4 MIMO can be implemented using 2 remote antenna units each with 2 antenna ports with 2 polarizations Rules for Antenna Selection: Select remote antenna units: that are not congested, that are in different directions from UE that are closer to UE. IF possible evaluate selection using MIMO matrix to optimize for rank and performance.

Rules for MIMO Conditions: Is MIMO gain from single remote antenna unit close to or equal that from antenna ports in geographically distinct remote antenna units? If yes, don't do enhanced MIMO.

Rules for Remote antenna unit Unit: If scheduling intelligence is added at remote antenna unit, agile switching between MIMO layer assignments to remote antenna unit antenna ports can take place, else operation is semi static.

Rules for Qualification Criteria: MIMO capable, # of good associations>MIMO order, static or semi-static, enough HFC/eNodeB resources.

Rules for UE Selection: Select UE based on capacity needs, antenna types, service level, Do not select if there is indication that UE is moving at speed greater than a certain threshold (design parameter).

One non-limiting aspect of the present invention contemplates how a cable network is used to transmit and distribute signals from a central location to remote antenna units that are controlled from this central location and carry information to a targeted wireless receiver. The MIMO performance enhancements takes place by using multiple geographically separate antenna remotes. In a cable distribution network environment, these remote antenna units are equipped with radio transceivers and have the functionality described above, which preserves diversity while traversing the cable environment. In one completed mode of operation in MIMO systems, one remote antenna unit is used to carry information to a target wireless user. This implementation relies on the degree of uncorrelation in the traversed wireless environment in addition to some uncorrelation processes subjected to each independent data set at the spatial-multiplexing-block to lead to a higher degree of uncorrelation and the resulting MIMO gain. In such systems only the remote antenna unit with the best transmissions characteristics to the target wireless user is used for communication. In one embodiment of this invention, using a Cable distributed LTE system, it uses processes to generate spatially multiplexed LTE signals but over antenna remotes that are geographically separated. Because of the enhancements in data set signal uncorrelation obtained through the geographical separation of the antenna ports network distribution, the need for uncorrelating data sets at the spatial multiplexing functional block is minimized. In fact the spatial diversity enhancement obtained by this technique is expected to exceed what can be achieved by the traditionally used spatial-multiplexing-block at the base station combined with the spatial diversity from a single antenna location because of the uncorrelation obtained by geographical separation of antennas. This is particularly true in the case of smaller cell networks where spatial diversity is diminished due to the shorter distances between antenna and wireless subscriber.

In this example the distribution of independent data sets to remote antenna units have been shown with a minimum granularity of antenna port pairs. These could also be distributed into single antenna ports but are shown here in pairs to leverage the uncorrelation capabilities achieved through cross polarization or other polarization multiplexing techniques. However, depending on the receiver capabilities for receiving spatially diverse signals it could use any number of antennas, resulting in a higher order MIMO. One mechanism by which remote antenna units and physical antenna ports are selected is through a mapping of the specific channel frequencies within the cable environment to the optimum physical antenna ports distributed across the cable network. For example, operating in a conventional cellular scenario the different remote antenna units would be evaluated to determine which antenna port is the most suitable to be used for communication with the target wireless user. The best would be chosen for communication. In one aspect of this invention, the ranking based on performance of the remote antenna units would be leveraged to select not one but multiple remote antenna units based on the capability of the UE or wireless end device. If the UE has a capability of 4×4 MIMO you could use any of the following configurations examples:

1) Use four highest performing remote antenna units with one physical antenna port used from each remote antenna unit.

2) Use two highest performing remote antenna units with two physical antenna ports used from each remote antenna unit. In each remote antenna unit spatial diversity can be leveraged using polarization diversity between the two ports co-located in each remote antenna unit.

3) Use three highest performing antenna remotes with two physical antenna ports used from one antenna remote and the remaining two antenna remotes with one antenna port each being used. In the antenna remote with two antenna ports spatial diversity can be leveraged using polarization diversity between the two antenna ports used.

The assessment of which sets of antenna remotes and physical antenna ports are used, may occur in the same fashion and with the same frequency as a traditional system would use for assessing whether one antenna remote is still optimal for the single antenna remote case. In other embodiments of this disclosure additional complexity in the selection of which antenna ports should be used is considered. Traffic consideration, services provided, application level requirements, channel utilization and remote antenna unit capabilities are some of the criteria that can be added to the antenna port selection process. When multiple criteria are used, a global optimization process must take place to configure this cable distributed antenna system in a way that meets the target requirements for all end-stations. In MIMO systems where only a single remote antenna unit is used, thereby having all the physical antenna ports co-located, it forces the system to rely on good spatial diversity in the physical port to port paths to have a high performance. This performance is measured through the MIMO transfer function matrix with elements $h_{i,j}$ where the matrix has to maintain maximum rank as well as high values. A good multipath environment improves to some extend the MIMO transfer function performance. However even in the best of cases, the degree of uncorrelation is limited and the gain and resulting modulation orders that can be achieved are limited. The degree of uncorrelation in a shorter path case is likely lower than a longer path. The use of geographically separate physical antenna ports provides a natural optimal spatial diversity configuration with uncorrelated data paths. This invention may leverage the cable network and the use of geographically separate physical antenna port to achieve optimum MIMO performance.

One aspect of this invention describes how a distributed antenna system is used to optimize MIMO performance through in situ beamforming, leveraging target wireless receiver location information extracted locally at the antenna site. In one aspect, it is proposed to use the asymmetric antenna distribution typically found in the field between the remote antenna units and the handset antennas in the mobile devices (user equipment/UE). In one proposed embodiment of a cable distributed antenna system, it is intended to add beamforming functionality to the MIMO enhancement mechanism. Leveraging geographically separated physical antenna ports, it is proposed to enable the use of just 4 of 8 physical antenna ports in a 4×4 MIMO system using duplicate antennas for the implementation of a high performance 4×4 MIMO system. The additional 4 physical antenna ports used to implement an 4×4 MIMO without beamforming can now be used to add beamforming and further enhance the performance of the 4×4 MIMO.

In order to save cable distribution resources, it is advantageous to use the cable transport medium only to carry independent data set information. Along with the data set, information regarding the location of the target and the location of the remote antenna unit (Latitude and longitude) can be extracted at the remote antenna unit site using a special UE device which is designed to sniff and extract location information. This information is obtained locally at the remote antenna unit site, additional beam-forming processing takes place to leverage unused antenna ports to produce beam steering. Most of the gains from spatial diversity have already been achieved and the capability of the system could be limited to a 4×4 MIMO. In this fashion additional gain with beam forming/steering can be obtained. This result in a very efficient MIMO transfer function matrix as the uncorrelation through spatial diversity by transmitting from different locations is effectively combined with an increase in gain achieved through beamforming. Location information that provides with the necessary information to generate beamforming can be carried in-band or can be deduced through triangulation mechanisms from the signal strength of the different antennas in the area around the wireless device.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of facilitating wireless signaling comprising:
determining a first signal desired for transport to a first device;
separating the first signal into at least a first part, a second part, a third part and a fourth part, each of the first, second, third and fourth parts being frequency diverse at least in that each is modulated at a different frequency;
facilitating transmission of the first, second, third and fourth parts over a wireline communication medium such that at least one of the first, second, third and fourth parts are received at a first remote antenna unit and at least one of the first, second, third and fourth parts other than the at least one of the first, second, third and fourth parts received at the first remote antenna unit are received at a second remote antenna unit, the first and second remote antenna units being configured to wirelessly transmit the received one or more of the first, second, third and fourth parts to the first device over a wireless communication medium; and
facilitating transmission such that the first, second, third and fourth parts travel a greater distance over the wireline communication medium than when subsequently transmitted over the wireless communication medium and such that at least one of the first, second, third and fourth parts received at the first remote antenna unit travel through a first path within the wireline communication medium that is different at least in part from a second path the at least one of the first, second, third and fourth parts received at the second remote antenna unit travel within the wireline communication medium.

2. The method of claim 1 further comprising:
determining a first location of the first device;
determining three or more remote antenna units available within the first location to facilitate wirelessly transmitting the first, second, third and fourth parts; and
selecting the first and second remote antenna units from the three or more remote antenna units to facilitate wirelessly transmitting the first, second, third and fourth parts to the first device.

3. The method of claim 2 further comprising determining spatial diversity for each of the three or more remote antenna units relative to the first location of the first device and selecting the first and second remote antenna units from the three or more remote antenna units based at least in part on the spatial diversity.

4. The method of claim 3 further comprising determining the spatial diversity by calculating an angular position of each of the plurality of remote antenna units relative to the first location.

5. The method of claim 2 further comprising:
determining beamforming capabilities for each of the three or more antenna units relative to the first location of the first device; and
selecting the first and second remote antenna units based at least in part on the beamforming capabilities.

6. The method of claim 5 further comprising selecting the first and second remote antenna units from the three or more remote antenna units based on having beamforming capabilities sufficient to facilitate directing wireless signaling toward the first location.

7. The method of claim 6 further comprising providing beamforming instructions to each of the first and second remote antenna units, the beamforming instructions controlling amplitude and phase or delay of wireless signaling emitted therefrom in a manner sufficient to facilitate directing wireless signaling toward the first location.

8. The method claim 7 further comprising providing updated beamforming instructions to each of the first and second remote antenna units in order to adjust the amplitude and phase or delay of the wireless signaling based upon movement of the first device from the first location to a second location such that the wireless signaling becomes directed toward the second location more so than the first location.

9. A method of facilitating wireless signaling comprising:
determining a first signal desired for transport to a first device;
separating the first signal into at least a first part, a second part, a third part and a fourth part, each of the first, second, third and fourth parts being frequency diverse at least in that each is modulated at a different frequency;
facilitating transmission of the first, second, third and fourth parts over a wireline communication medium such that at least one of the first, second, third and fourth parts are received at a first remote antenna unit and at least one of the first, second, third and fourth parts other than the at least one of the first, second, third and fourth parts received at the first remote antenna unit are received at a second remote antenna unit, the first and second remote antenna units being configured to wirelessly transmit the received one or more of the first, second, third and fourth parts to the first device over a wireless communication medium;
determining a first location of the first device;
determining three or more remote antenna units available within the first location to facilitate wirelessly transmitting the first, second, third and fourth parts;
selecting the first and second remote antenna units from the three or more remote antenna units to facilitate wirelessly transmitting the first, second, third and fourth parts to the first device;
determining spatial diversity for each of the three or more remote antenna units relative to the first location of the first device and selecting the first and second remote antenna units from the three or more remote antenna units based at least in part on the spatial diversity;
determining the spatial diversity by calculating an angular position of each of the plurality of remote antenna units relative to the first location; and
selecting the first and second remote antenna units based at least in part on having related angular positions greater than an angular threshold.

10. A method of facilitating wireless signaling comprising:
determining a first signal desired for transport to a first device;
separating the first signal into at least a first part, a second part, a third part and a fourth part, each of the first, second, third and fourth parts being frequency diverse at least in that each is modulated at a different frequency;
facilitating transmission of the first, second, third and fourth parts over a wireline communication medium such that at least one of the first, second, third and fourth parts are received at a first remote antenna unit and at least one of the first, second, third and fourth parts other than the at least one of the first, second, third and fourth parts received at the first remote antenna unit are received at a second remote antenna unit, the first and second remote antenna units being configured to wirelessly transmit the received one or more of the first, second, third and fourth parts to the first device over a wireless communication medium;
instructing the first and second remote antenna units to transmit the first, second, third and fourth parts at a first frequency;
determining a second signal desired for wireless receipt at a second device;
separating the second signal into at least a fifth part, a sixth part, a seventh part and an eighth part, each of the fifth, sixth, seventh and eighth parts being frequency diverse at least in that each is modulated at a different frequency; and
facilitating transmission of the fifth, sixth, seventh and eighth parts over the wireline communication medium such that at least one of the fifth, sixth, seventh and eighth parts are received at the first remote antenna unit and at least one of the fifth, sixth, seventh and eighth parts other than the at least one of the fifth, sixth, seventh and eighth parts received at the first remote antenna unit are received at the second remote antenna unit, the first and second remote antenna units being configured to wirelessly transmit the received one or more of the fifth, sixth, seventh and eighth parts to the second device over the wireless communication medium at a second frequency, the second frequency being different from the first frequency used to wirelessly transmit the first, second, third and fourth parts.

11. A method of facilitating wireless signaling comprising:
determining a first signal desired for transport to a first device;
multiplexing the first signal into at least a first part, a second part, a third part and a fourth part such that each of the first, second, third and fourth parts are different portions of the first signal;
determining a plurality of remote antenna units within a vicinity of the first device, each of the plurality of remote antenna units being connected to a wireline communication medium and having capabilities sufficient to facilitate wirelessly transmitting one or more of the first, second, third and fourth parts to the first device;
determining at least a first remote antenna unit and a second remote antenna unit of the plurality of remote antennas units to wirelessly transmit one or more of the first, second, third and fourth parts to the first device based on relative wireless communications capabilities, the relative wireless communication capabilities representing capabilities of each of the plurality of remote antenna units to wireless communicate with the first device;
transmitting at least one of the first, second, third and fourth parts to the first remote antenna unit over the wireline communication medium;
transmitting at least one of the first, second, third and fourth parts to the second remote antenna unit over the wireline communication medium such that the second remote antenna unit receives at least a different one of the first, second, third and fourth parts than the first remote antenna unit, the first and second remote antenna units thereafter wirelessly transmitting the received at least one of the first, second, third and fourth parts to the first device;
determining the vicinity relative to a first location of the first device;
determining spatial diversity for each of the plurality of remote antenna units relative to the first location;
selecting the first and second remote antenna units from the plurality of remote antenna units based at least in part on the spatial diversity;

determining the spatial diversity by calculating an angular position of each of the plurality of remote antenna units relative to the first location; and determining the first and second remote antenna units based at least in part on having related angular positions greater than an angular threshold.

12. The method of claim 11 further comprising:

determining the vicinity relative to a first location of the first device;

determining beamforming capabilities for each of the plurality of remote antenna units relative to the first location; and selecting the first and second remote antenna units based at least in part on beamforming capabilities.

13. The method of claim 12 further comprising selecting the first and second remote antenna units from at least two of the plurality of remote antenna units having beamforming capabilities sufficient to facilitate directing wireless signaling toward the first location.

14. A non-transitory computer-readable medium having non-transitory instructions operable with a processor to facilitate wireless signaling, the non-transitory instructions being sufficient to facilitate:

determining a plurality of signaling paths within a wireline communication medium sufficient to facilitate wireline signaling between a signal processor and one or more of a first plurality of remote antenna units;

determining a first signal intended for transmission from the signal processor to a first wireless device;

determining wireless communication capabilities for the first plurality of remote antenna units, the wireless communication capabilities reflecting capabilities to facilitate wirelessly communicating with the first wireless device;

selecting at least a first remote antenna unit and a second remote antenna unit of the first plurality of remote antennas units to wirelessly communicate with the first wireless device based on the wireless communications capabilities;

separating the first signal into at least a first part and a second part such that each of the at least first and second parts includes a different portion of the first signal;

transmitting the first part to the first remote antenna unit over a corresponding one of the paths, the first remote antenna unit thereafter wirelessly transmitting the first part to the first device;

transmitting the second part to the second remote antenna unit over a corresponding one of the paths, the second remote antenna unit thereafter wirelessly transmitting the second part to the first device;

selecting the first plurality of remote antenna units for the purposes of transmitting the first signal to the first wireless device from a second, greater plurality of remote antenna units connected to the wireline communication medium, the first plurality of remote antenna units being remote antenna units having connectivity with the first device, at least a portion of the second plurality of remote antenna units lacking connectivity with the first device;

determining a fourth and a fifth plurality of the first plurality of remote antenna units, the fourth plurality of remote antenna units having connectivity equal to or greater than a pass/fail threshold and the fifth plurality of remote antenna units having connectivity less than the pass/fail threshold;

determining the wireless communication capabilities for the fourth plurality of remote antenna units and not the fifth plurality of remote antenna units, including determining spatial diversity and beamforming capabilities for each of the fourth plurality of remote antenna units relative to the first device; and selecting the first and second remote antenna units from the fourth plurality of remote antenna units based on the associated spatial diversity and beamforming capabilities.

15. A non-transitory computer-readable medium having non-transitory instructions operable with a processor to facilitate wireless signaling, the non-transitory instructions being sufficient to facilitate:

determining a plurality of signaling paths within a wireline communication medium sufficient to facilitate wireline signaling between a signal processor and one or more of a first plurality of remote antenna units;

determining a first signal intended for transmission from the signal processor to a first wireless device;

determining wireless communication capabilities for the first plurality of remote antenna units, the wireless communication capabilities reflecting capabilities to facilitate wirelessly communicating with the first wireless device;

selecting at least a first remote antenna unit and a second remote antenna unit of the first plurality of remote antennas units to wirelessly communicate with the first wireless device based on the wireless communications capabilities;

separating the first signal into at least a first part and a second part such that each of the at least first and second parts includes a different portion of the first signal;

transmitting the first part to the first remote antenna unit over a corresponding one of the paths, the first remote antenna unit thereafter wirelessly transmitting the first part to the first device;

transmitting the second part to the second remote antenna unit over a corresponding one of the paths, the second remote antenna unit thereafter wirelessly transmitting the second part to the first device; and determining the wireless communication capabilities for the first plurality of remote antenna units according to the following formula $$\sum_{i=1}^{N} \frac{d_i^2}{G_i P_{MAXi}} \left\{ \left| |\theta_i - \theta_{i-1}| - \frac{360}{N} \right| + \left| |\theta_{i+1} - \theta_i| - \frac{360}{N} \right| \right\}$$

where N=number of the first plurality of remote antenna units; i=remote antenna unit index, varies from 1 to N; $G_i$=antenna gain for the $i_{th}$ remote antenna unit; $P_{maxi}$=maximum power that the $i_{th}$ remote antenna unit can transmit; $d_i$=distance from the first device to the $i_{th}$ remote antenna unit; and $\theta_i$=angle in degrees indicating direction from the first device to the $i_{th}$ remote antenna unit.

* * * * *